United States Patent
Sapir et al.

(10) Patent No.: US 12,314,908 B2
(45) Date of Patent: May 27, 2025

(54) DATA CENTER ASSET AUTHENTICATION FOR A PROSPECTIVE DATA CENTER ASSET OWNER VIA AN ONBOARDING OPERATION

(71) Applicant: Dell Products L.P., Round Rock, TX (US)

(72) Inventors: Stav Sapir, Beer Sheba (IL); Bradley K. Goodman, Nashua, NH (US); Joseph B. Caisse, Burlington, MA (US); Muzhar S. Khokhar, Shrewsbury, MA (US); Ching-Yun Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 188 days.

(21) Appl. No.: 18/211,614

(22) Filed: Jun. 20, 2023

(65) Prior Publication Data
US 2024/0428197 A1 Dec. 26, 2024

(51) Int. Cl.
*G06Q 10/1053* (2023.01)
*G06F 21/62* (2013.01)

(52) U.S. Cl.
CPC ..... *G06Q 10/1053* (2013.01); *G06F 21/6218* (2013.01)

(58) Field of Classification Search
CPC .................. G06Q 10/1053; G06F 21/6218
See application file for complete search history.

(56) References Cited

U.S. PATENT DOCUMENTS

| 10,349,268 | B1* | 7/2019 | Serrano | G06Q 30/0635 |
|---|---|---|---|---|
| 2007/0214356 | A1* | 9/2007 | Song | H04L 63/08 |
| | | | | 713/156 |
| 2012/0047370 | A1* | 2/2012 | Abdallah | H04L 9/3247 |
| | | | | 713/186 |
| 2018/0097640 | A1* | 4/2018 | Queralt | H04L 63/0815 |
| 2018/0262344 | A1* | 9/2018 | Broumas | H04L 9/30 |
| 2019/0166116 | A1* | 5/2019 | Kumar | H04L 9/0825 |
| 2020/0359212 | A1* | 11/2020 | Chen | H04L 63/102 |
| 2021/0044580 | A1* | 2/2021 | Grødum | H04W 12/043 |
| 2022/0021671 | A1* | 1/2022 | Banerjee | H04L 63/0876 |
| 2024/0129136 | A1* | 4/2024 | Chao | H04L 9/3268 |
| 2024/0129736 | A1* | 4/2024 | Chao | H04L 9/3268 |

* cited by examiner

*Primary Examiner* — Darren B Schwartz
(74) *Attorney, Agent, or Firm* — Terrile, Cannatti & Chambers, LLP; Stephen A. Terrile

(57) ABSTRACT

A system, method, and computer-readable medium for performing a data center monitoring and management operation. The data center monitoring and management operation includes: providing the data center asset to a prospective owner; establishing a secure communication channel between an onboarding system and the data center asset; establishing a communication channel between a rendezvous server and the data center asset; exchanging information between the onboarding system and the data center asset via the secure communication channel, the information including a data center asset ownership voucher; maintaining the data center asset ownership voucher at the rendezvous server; and, using the data center asset ownership voucher to associate the data center asset with the prospective owner.

20 Claims, 16 Drawing Sheets

DATA CENTER ASSET AUTHENTICATION FOR A PROSPECTIVE DATA CENTER ASSET OWNER VIA AN ONBOARDING OPERATION

BACKGROUND OF THE INVENTION

Field of the Invention

The present invention relates to information handling systems. More specifically, embodiments of the invention relate to performing a data center monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing data center monitoring and management operation, comprising: providing the data center asset to a prospective owner; establishing a secure communication channel between an onboarding system and the data center asset; establishing a communication channel between a rendezvous server and the data center asset; exchanging information between the onboarding system and the data center asset via the secure communication channel, the information including a data center asset ownership voucher; maintaining the data center asset ownership voucher at the rendezvous server; and, using the data center asset ownership voucher to associate the data center asset with the prospective owner.

In another embodiment the invention relates to a system comprising: a processor; a data bus coupled to the processor; and, a non-transitory, computer-readable storage medium embodying computer program code, the non-transitory, computer-readable storage medium being coupled to the data bus, the computer program code interacting with a plurality of computer operations and comprising instructions executable by the processor and configured for: providing the data center asset to a prospective owner; establishing a secure communication channel between an onboarding system and the data center asset; establishing a communication channel between a rendezvous server and the data center asset; exchanging information between the onboarding system and the data center asset via the secure communication channel, the information including a data center asset ownership voucher; maintaining the data center asset ownership voucher at the rendezvous server; and, using the data center asset ownership voucher to associate the data center asset with the prospective owner.

In another embodiment the invention relates to a computer-readable storage medium embodying computer program code, the computer program code comprising computer executable instructions configured for: providing the data center asset to a prospective owner; establishing a secure communication channel between an onboarding system and the data center asset; establishing a communication channel between a rendezvous server and the data center asset; exchanging information between the onboarding system and the data center asset via the secure communication channel, the information including a data center asset ownership voucher; maintaining the data center asset ownership voucher at the rendezvous server; and, using the data center asset ownership voucher to associate the data center asset with the prospective owner.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium for performing a data center monitoring and management operation, described in greater detail herein. Various aspects of the invention reflect an appreciation that it is common for a typical data center to monitor and manage tens, if not hundreds, of thousands of different assets, such as certain computing and networking devices, as described in greater detail herein. Certain aspects of the invention likewise reflect an appreciation that such data center assets, which may be distributed, are typically implemented to work in combination with one another for a particular purpose. Likewise, various aspects of the invention reflect an appreciation that such purposes generally involve the performance of a wide variety of tasks, operations, and processes to service certain workloads.

Various aspects of the invention likewise reflect an appreciation that such tasks, operations, and processes may include automating the secure onboarding of certain data center assets within a computing environment, such as a data center monitoring and management environment, described in greater detail herein. One known approach for such automated onboarding is the Fast Identity Online (FIDO) Alliance's FIDO Device Onboard (FDO) specification, described in greater detail herein. However, while various embodiments of the invention reflect an appreciation that the FDO specification addresses certain aspects of automating the onboarding of device, such as a data center asset, it has certain limitations. For example, it fails to provide controls for authorizing which owner of a data center asset can onboard it and which cannot, according to their respective role, as described in greater detail herein.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
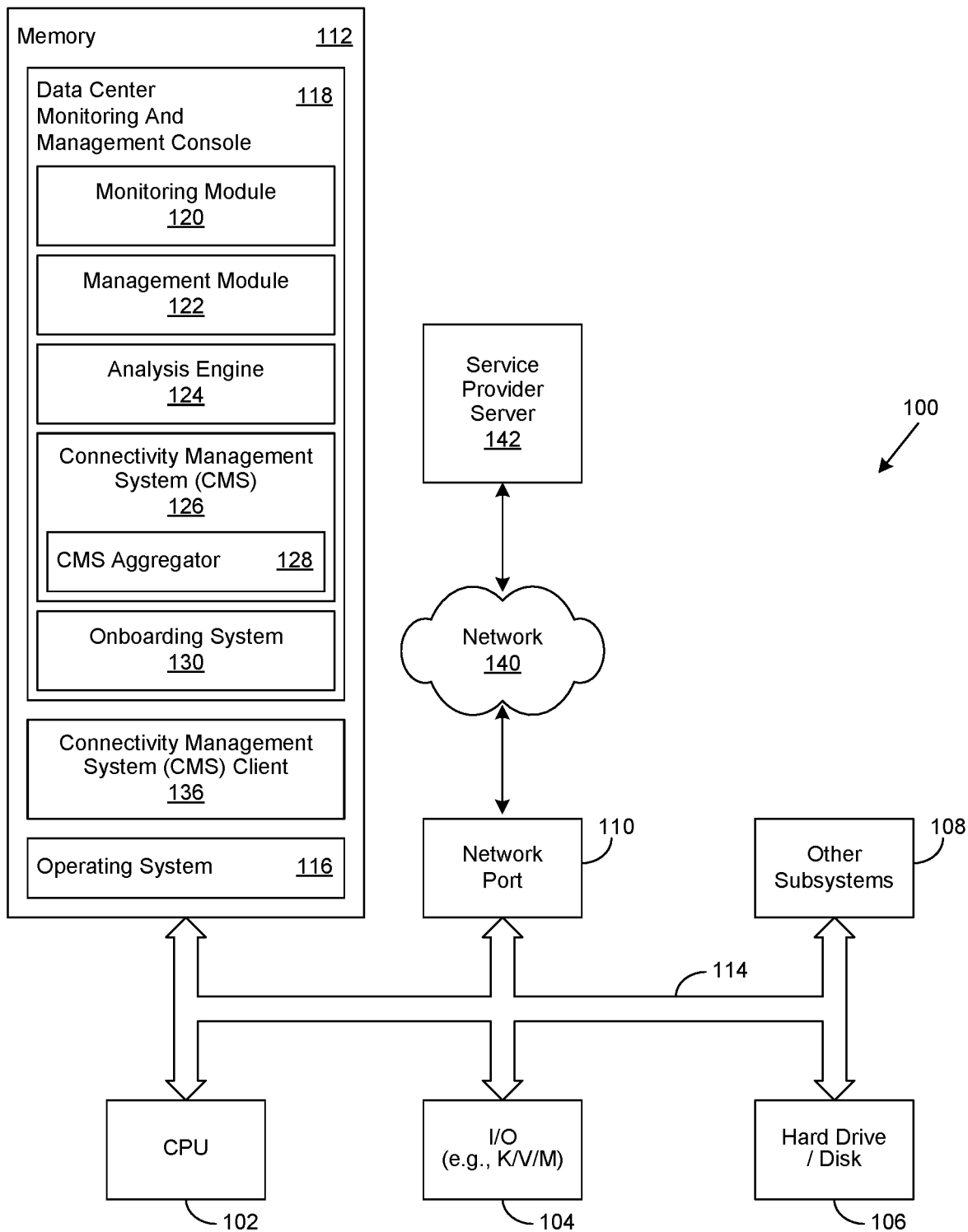
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118, or a connectivity management system (CMS) client 136. In one embodiment, the information handling system 100 is able to download the data center monitoring and management console 118, or the CMS client 136, or both, from the service provider server 142. In another embodiment, the functionality respectively provided by the data center monitoring and management console 118, or the CMS client 136, or both, may be provided as a service from the service provider server 142.

In certain embodiments, the data center monitoring and management console 118 may include a monitoring module 120, a management module 122, an analysis engine 124, a connectivity management system (CMS) 126, a data center asset onboarding system 130, or a combination thereof. In certain embodiments, the CMS 126 may be implemented to include a CMS aggregator 128. In certain embodiments, the data center monitoring and management console 118 may be implemented to perform a data center monitoring and management operation. In certain embodiments, the information handling system 100 may be implemented to include either a CMS 126, or a CMS client 136, or both.

In certain embodiments, the data center monitoring and management operation may be performed during operation of an information handling system 100. In various embodiments, performance of the data center monitoring and management operation may result in the realization of improved monitoring and management of certain data center assets, as described in greater detail herein. In certain embodiments, the CMS 126 may be implemented in combination with the CMS client 136 to perform a connectivity management operation, described in greater detail herein. As an example, the CMS 126 may be implemented on one information handling system 100, while the CMS client 136 may be implemented on another, as likewise described in greater detail herein.

Figure 2:
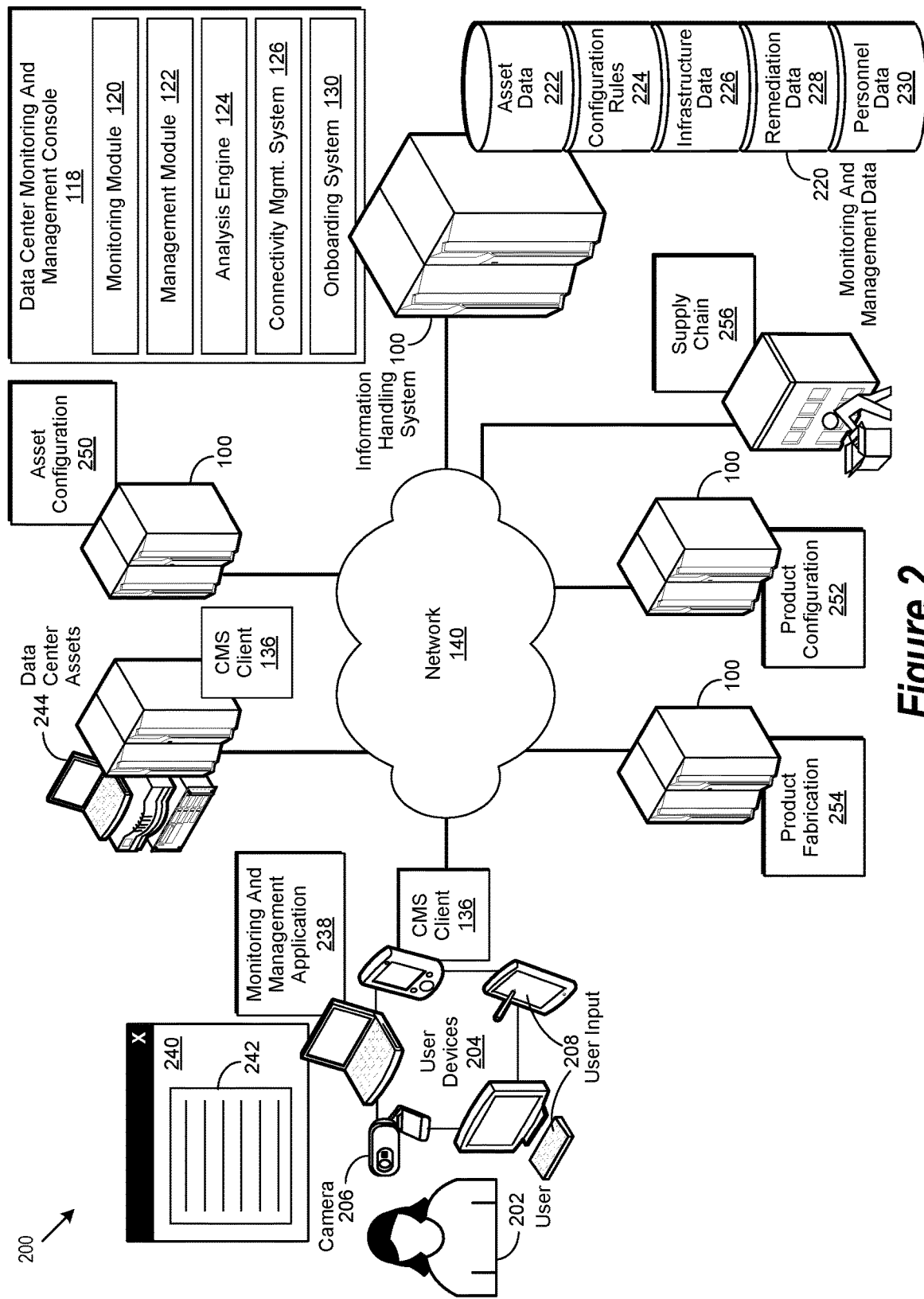
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything, tangible or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to a data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software applications, software services, firmware code, and other non-physical, computer-based assets. Other examples of intangible data center assets 244 may include digital assets, such as structured and unstructured data of all kinds, still images, video images, audio recordings of speech and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioners of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, a connectivity management operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

Likewise, as used herein, a connectivity management operation (also referred to as a data center connectivity management operation) broadly refers to any task, function, procedure, or process performed, directly or indirectly, to manage connectivity between a particular data center asset 244 and a particular data center monitoring and management console 118. In various embodiments, one or more connectivity management operation may be performed to ensure that data exchanged between a particular data center asset 244 and a particular data center monitoring and management console 118 during a communication session is secured. In certain of these embodiments, as described in greater detail herein, various cryptographic approaches familiar to skilled practitioners of the art may be used to secure a particular communication session.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, an analysis engine 124, and a connectivity management system (CMS) 126, and an onboarding system 130, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle.

In various embodiments, the monitoring module 120, the management module 122, the analysis engine 124, and the CMS 126, and the onboarding system 130, may be implemented, individually or in combination with one another, to perform a data center asset monitoring and management operation, as likewise described in greater detail herein. In various embodiments, a CMS client 136 may be implemented on certain user devices 204, or certain data center assets 244, or a combination thereof. In various embodiments, the CMS 126 may be implemented in combination with a particular CMS client 136 to perform a connectivity management operation, as described in greater detail herein. In various embodiments, the CMS 126 may likewise be implemented in combination with the onboarding system 130 to perform a data center monitoring and management operation, described in greater detail herein. In certain embodiments, a data center monitoring and management operation may be implemented to include one or more onboarding operations, likewise described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 220, data center asset configuration rules 224, data center infrastructure data 226, data center remediation data 228, and data center personnel data 230.

As used herein, data center asset data 222 broadly refers to information associated with a particular data center asset 244, such as an information handling system 100, or an associated workload, that can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 244 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater detail herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with performing a data center asset remediation operation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task they are assigned, described in greater detail herein.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well as the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at a later time to perform an analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented to receive and communicate various image and audio signals to a user device 204 via a Universal Serial Bus (USB) interface. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure, a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
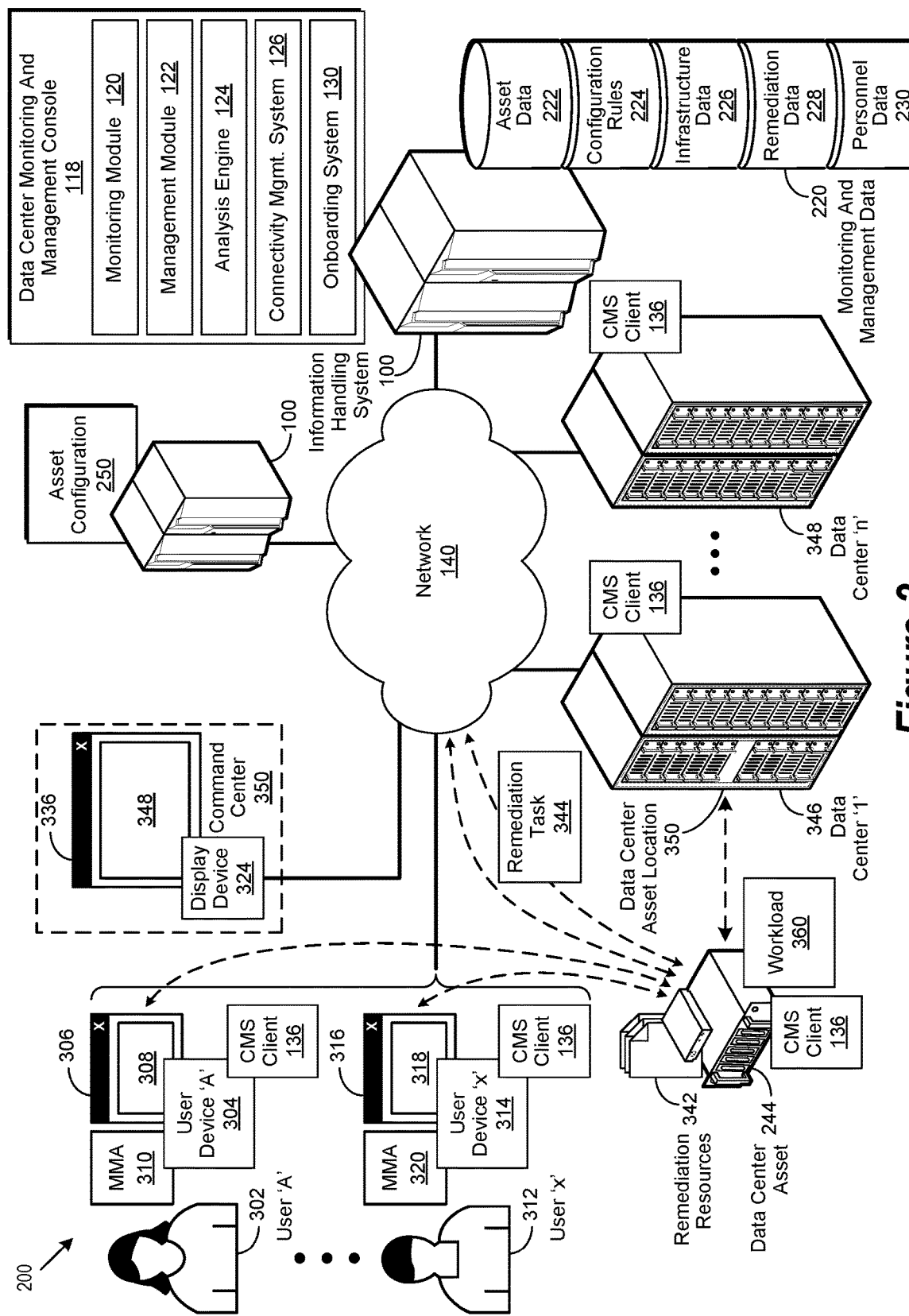
FIG. 3 shows a functional block diagram of the performance of certain data center monitoring and management operations.

FIG. 3 shows a functional block diagram of the performance of certain data center monitoring and management operations implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein.

In certain embodiments, a data center asset 244 may be implemented to process an associated workload 360. A workload 360, as used herein, broadly refers to a measure of information processing that can be performed by one or more data center assets 244, individually or in combination with one another, within a data center monitoring and management environment 200. In certain embodiments, a workload 360 may be implemented to be processed in a virtual machine (VM) environment, familiar to skilled practitioners of the art. In various embodiments, a workload 360 may be implemented to be processed as a containerized workload 360, likewise familiar to those of skill in the art.

In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, an analysis engine 124, and a connectivity management system (CMS) 126, and an onboarding system 130, or a combination thereof, as described in greater detail herein. In various embodiments, a CMS client 136, described in greater detail herein may be implemented on certain user devices 'A' 304 through 'x' 314, or certain data center assets 244, or within data centers '1' 346 through 'n' 348, or a combination thereof. In certain embodiments, the CMS 126 may be implemented in combination with a particular CMS client 136 to perform a connectivity management operation, as likewise described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application (MMA) 310 through 320, described in greater detail herein, may be respectively implemented on user devices 'A' 304 through 'x' 314. In certain embodiments, the UI window 306 through 316 may be respectively implemented as a UI window of the data center MMA 310 through 320. In certain embodiments, the data center MMA 310 through 320 may be implemented to interact in combination with the data center monitoring and management console 118, and other components of the data center monitoring and management environment 200, to perform a data center monitoring and management operation. In various embodiments, performance of the data center monitoring and management operation may include the performance of one or more onboarding operations, described in greater detail herein.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 348 within a UI window 336.

In certain embodiments, the display device 324 may be implemented in a command center 350, familiar to those of skill in the art, such as a command center 350 typically found in a data center or a network operations center (NOC). In various embodiments, one or more of the users 'A' 302 through 'x' 312 may be located within the command center 350. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data center asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244, or an associated workload 360, in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented to generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 350 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4:
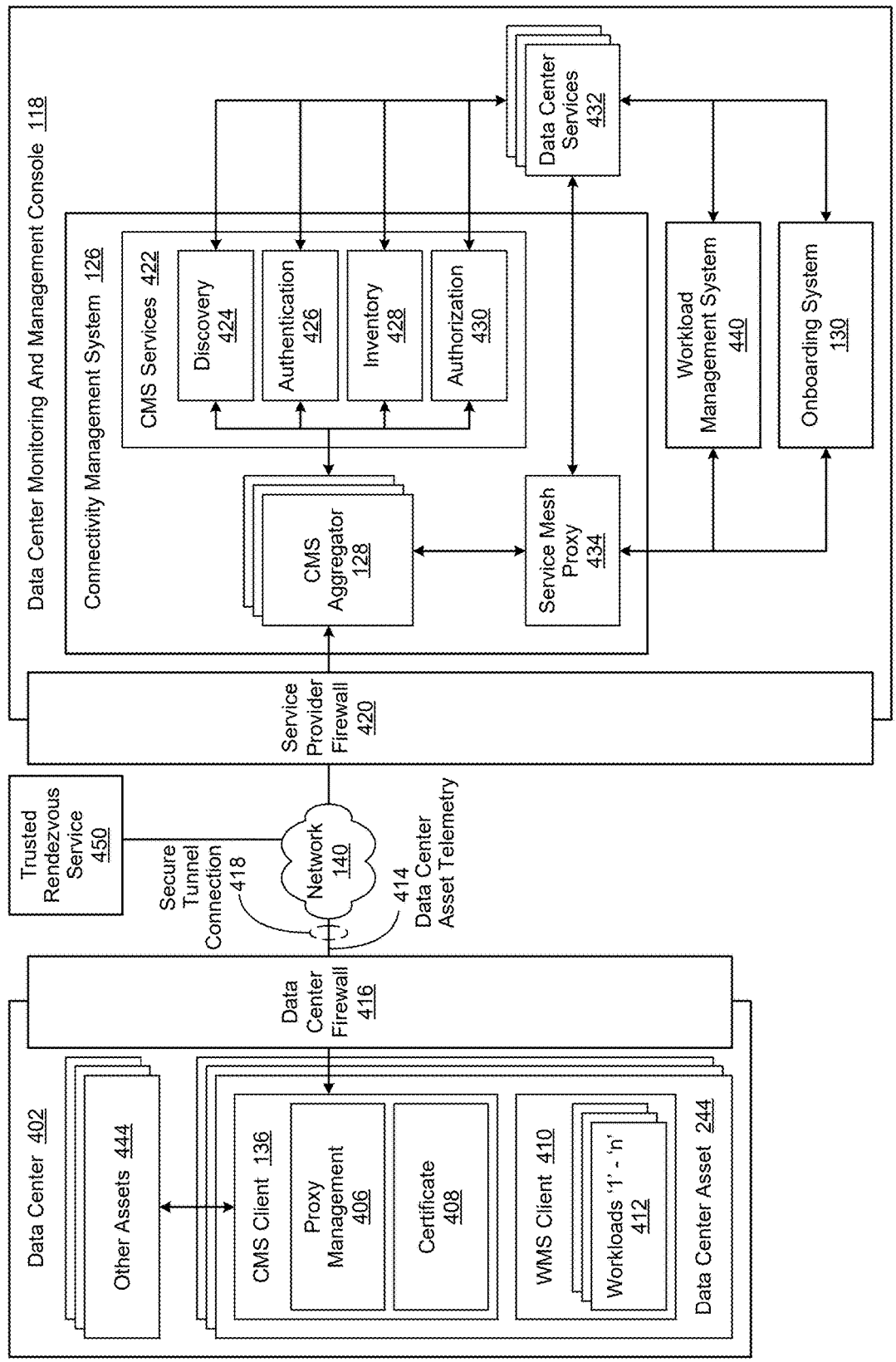
FIG. 4 shows a block diagram of a data center monitoring and management console.

FIG. 4 shows a block diagram of a connectivity management system implemented in accordance with an embodiment of the invention. In various embodiments, a data center monitoring and management console 118, described in greater detail herein, may be implemented to include a connectivity management system (CMS) 126, an onboarding system 130, one or more data center services 432, and a workload management system (WMS) 440 or a combination thereof. In various embodiments, the CMS 126 may be implemented individually, or in combination with a particular CMS client 136 to perform a connectivity management operation, likewise described in greater detail herein. In various embodiments, one or more connectivity management operations may be performed to initiate, and manage, secure, bi-directional, real-time connectivity between a data center monitoring and management console 118 and a particular data center asset 244, each of which are likewise described in greater detail herein.

In various embodiments, the onboarding system 130 may be implemented to perform an onboarding operation. In certain embodiments, the CMS 126 and the onboarding system 130 may likewise be implemented in combination with one another to perform a particular connectivity management operation, or a particular onboarding operation, or a combination of the two. As used herein, onboarding broadly refers to deploying a new device, such as a data center asset 244, into an operational information technology (IT) environment such that it can be trusted, configured, and integrated with other devices within the environment. Accordingly, as likewise used herein, an onboarding operation broadly refers to any function, operation, procedure, or process performed, directly or indirectly, to automate the secure onboarding of one or more data center assets 244 into a data center monitoring and management environment, such that their operation and performance can be monitored and managed, as described in greater detail herein.

In various embodiments, one or more onboarding operations may be performed, as likewise described in greater detail herein, to authenticate the manufacturer, a prior owner, or the current owner, or a prospective owner, or a combination thereof, of an associated data center asset 244. In various embodiments, performance of an onboarding operation may include the performance of one or more ownership transfer operations. As used herein, an ownership transfer operation broadly refers to any function, operation, procedure, or process performed, directly or indirectly, to securely transfer the ownership of a data center asset 244 from its current owner to a prospective owner. In certain embodiments, an ownership transfer operation provides an ownership transfer protocol. In certain embodiments, the ownership transfer protocol provides a three-party, two-phase commit protocol. In certain embodiments, an ownership transfer operation includes providing onboarding authorization of a last owner in a local ownership chain. In certain embodiments, the onboarding authorization is provided when the last owner also has a provider role. In certain embodiments, the onboarding authorization is provided via the rendezvous server.

In various embodiments, the onboarding system 130 may be implemented to incorporate one or more concepts, definitions, functionalities, and procedures included in the Fast Identity Online (FIDO) Alliance's FIDO Device Onboard (FDO) standard. Skilled practitioners of the art will be familiar with the FIDO Alliance, which is an organization whose mission is to develop and promote a set of open source, technology-agnostic security and authentication standards to reduce over-reliance on passwords. One such standard is the FIDO Device Onboard (FDO) specification, which is an open standard for securely onboarding a device, such as a data center asset 244, within a computing environment, such as a data center monitoring and management environment, described in greater detail herein.

Various embodiments of the invention reflect an appreciation that the FDO specification supports the transfer of a device's ownership from one owner to another, such as members of a supply chain, through the use of an FDO ownership voucher. Skilled practitioners of the art will be familiar with an FDO ownership voucher, which is a structured digital document that links a device, such as a data center asset 244, with its current owner. In various embodiments, an FDO ownership voucher may be implemented as a chain of signed public keys, with each signature of a particular public key authorizing the possessor of the corresponding private key to take ownership of the device, or pass ownership through another link in the chain. Accordingly, an FDO ownership voucher may be used in various embodiments to transfer digital ownership credentials from one owner to another without the need to power-on the device.

However, certain embodiments of the invention reflect an appreciation that the FDO ownership voucher has certain limitations. For example, the FDO ownership voucher, as currently implemented, allows the current owner of a device, which is typically the last owner in the chain of signed public keys, to onboard it. As a result, whoever is the current owner, despite their respective role, is able to onboard an associated device.

Various embodiments of the invention reflect an appreciation that this limitation poses certain challenges, as any member of a supply chain associated with a data center asset 244, such as its manufacturer, or a distributor, or a reseller, or a service provider, or a purchaser, could onboard it. Accordingly, one or more ownership transfer operations, described in greater detail herein, may be performed in various embodiments to extend the implementation of an FDO ownership voucher to enable controls for authorizing which owner of a data center asset 244 can onboard it and which cannot, according to their respective role, as described in greater detail herein. In certain of these embodiments, a trusted rendezvous service 450 may be implemented to enforce the authorization of which owner of a data center asset 244 can onboard it and which cannot. Those of skill in the art will be familiar with a rendezvous server, which in typical FDO implementations broadly refers to a network-based server, or an associated service, that acts as a rendezvous point between a newly powered-on data center asset 244 and an onboarding service, described in greater detail herein.

In various embodiments, the data center monitoring and management console 118 may be implemented in a cloud environment familiar to skilled practitioners of the art. In various embodiments, the cloud environment may be distributed. In certain embodiments, such a distributed cloud environment may be implemented to include two or more data centers 402. In certain embodiments, each data center 402 may be implemented to include one or more data center monitoring and management environments, described in greater detail herein. In various embodiments, each data center monitoring and management environment may be implemented to include one or more data center monitoring and management consoles 118. In certain of these embodiments, the two are more data center monitoring and management consoles 118 may be implemented to operate in combination with one another to perform one or more data center monitoring and management operations, or one or more onboarding operations, or a combination thereof. In certain embodiments, a particular data center monitoring and management console 118 implemented in one data center monitoring and management environment may likewise be implemented to perform one or more data center monitoring and management operations, or one or more onboarding operations, or a combination thereof, within another data center monitoring and management environment.

In various embodiments, the connectivity management system 126 may be implemented to include one or more CMS aggregators 128, one or more CMS services 422, and a service mesh proxy 434, or a combination thereof. In various embodiments, the CMS aggregator 128 may be implemented to interact with one or more of the CMS services 422, as described in greater detail herein. In various embodiments, the data center services 432 may likewise be implemented to interact with one or more of the CMS services 422, and the service mesh proxy 434, or a combination thereof. In certain embodiments, the CMS services 422 may be implemented to include a CMS discovery 424 service, a CMS authentication 426 service, a CMS inventory 428 service, and a CMS authorization 430 service, or a combination thereof.

In certain embodiments, a data center 402 may be implemented to include an associated data center firewall 416. In certain embodiments, the operator of the data center monitoring and management console 118 may offer its various functionalities and capabilities in the form of one or more or more cloud-based data center services 432, described in greater detail herein. In certain of these embodiments, the data center 402 may reside on the premises of a user of one or more data center services 432 provided by the operator of the data center monitoring and management console 118.

In various embodiments, one or more data center assets 244, described in greater detail herein, may be implemented within a particular data center 402. In certain embodiments, individual data center assets 244 may be implemented to include a workload management system (WMS) client 410, or a CMS client 136, or both. As used herein, a workload management system (WMS) 410, broadly refers to any software, firmware, or hardware, of a combination thereof, that may be implemented to perform one or more WMS operations. As likewise used herein, a WMS operation broadly refers to any function, operation, procedure, or process performed, directly or indirectly, to forecast, plan, distribute, schedule, configure, initiate, manage, or monitor, or a combination thereof, one or more workloads '1' through 'n' 412 such that they may be serviced by one or more data center assets 244.

One example of a WMS 410 is a hypervisor. Skilled practitioners of the art will be familiar with a hypervisor, also known as a virtual machine monitor (VMM), or virtualizer, which broadly refers to a type of computer software, firmware, or hardware, or a combination thereof, that can be implemented to create and run a virtual machine (VM). Those of skill in the art will likewise be familiar with a VM, which is a virtualization, or emulation, of a computer system that can be implemented to provide the functionality of a physical computer, or a particular capability thereof. In certain embodiments, a VM may be implemented in certain embodiments to service one or more workloads 412.

Another example of a WMS 410 is a container orchestration system, such as the open source container orchestration system known as Kubernetes®. Skilled practitioners of the art will be familiar with container orchestration systems, which broadly refer to a type of computer software, firmware, or hardware, or a combination thereof, that can be implemented to automate the operational effort involved in running containerized workloads and services on one or more data center assets 244. Those of skill in the art will likewise be familiar with a container, which is a unit of software that packages computer code, and its dependencies, such that an associated software application is able to run quickly and reliably across one or more computing environments. In certain embodiments, a container orchestration system may be implemented in certain embodiments to orchestrate one or more containers as one or more workloads 412. Skilled practitioners of the art will recognize that many such examples of a WMS 410 and an associated workload '1' through 'n' 412 are possible. Accordingly, the foregoing is not intended to limit the spirit, scope, or intent of the invention.

In various embodiments, a CMS client 136 implemented on one data center asset 244 may likewise be implemented to enable one or more connectivity management operations, or one or more onboarding operations, or a combination thereof, associated with one or more other data center assets 444 that are not respectively implemented with their own CMS client 136. In certain of these embodiments, the CMS client 136 may be implemented to assume the identity, and attributes, of a particular data center asset it is directly, or indirectly, associated with. In various embodiments, the CMS client 136 may be implemented to convey certain onboarding information associated with a particular data center asset 244 that may be used to service a particular workload '1' through 'n' 412, directly or indirectly, during a particular interval of time to the CMS aggregator 128.

In certain of these embodiments, the onboarding information may be conveyed as data center asset telemetry information 414 via a secure tunnel connection 418, described in greater detail herein, through a network 140 to a particular CMS aggregator 128. In certain embodiments, a CMS aggregator 128 may be implemented to provide such data center asset telemetry information 414 to the onboarding system 130, either directly, or through a service mesh proxy 434, likewise described in greater detail herein. In various embodiments, a CMS aggregator 128 may be implemented to provide certain data center asset telemetry information 414 to the onboarding system 130 as one or more CMS services 422. In certain of these embodiments, one or more data center services 432 may be implemented to receive such data center asset telemetry information 414 from one or more CMS services 422 and then provide it to the onboarding system 130.

In various embodiments, the CMS client 136 may be implemented with a proxy management module 406. In certain of these embodiments, the proxy management module 406 may be implemented to manage the CMS client's 136 connectivity to an external network 140 through an intermediary proxy server, or the data center firewall 416, or both. Those of skill in the art will be familiar with a proxy server, which as typically implemented, is a server application that acts as an intermediary between a client, such as a web browser, requesting a resource, such as a web page, from a provider of that resource, such as a web server.

In certain embodiments, the client of a proxy server may be a particular data center asset 244 requesting a resource, such as a particular data center service 432, from the data center monitoring and management console 118. Skilled practitioners of the art will likewise be aware that in typical proxy server implementations, a client may direct a request to a proxy server, which evaluates the request and performs the network transactions needed to forward the request to a designated resource provider. Accordingly, the proxy server functions as a relay between the client and a server, and as such acts as an intermediary.

Those of skill in the art will be aware that proxy servers also assist in preventing an attacker from invading a private network, such as one implemented within a data center 402 to provide network connectivity to, and between, certain data center assets 244. Skilled practitioners of the art will likewise be aware that server proxies are often implemented in combination with a firewall, such as the data center firewall 416. In such implementations, the proxy server, due to it acting as an intermediary, effectively hides an internal network from the Internet, while the firewall prevents unauthorized access by blocking certain ports and programs.

Accordingly, a data center firewall 416 may be configured to allow traffic emanating from a proxy server to pass through to an external network 140, while blocking all other traffic from an internal network. Conversely, a firewall may likewise be configured to allow network 140 traffic emanating from a trusted source to pass through to an internal network, while blocking traffic from unknown or untrusted external sources. As an example, the data center firewall 416 may be configured in various embodiments to allow traffic emanating from the CMS client 136 to pass, while the service provider firewall 420 may be configured to allow traffic emanating from the CMS aggregator 128 to pass. Likewise, the service provider firewall 420 may be configured in various embodiments to allow incoming traffic emanating from the CMS client 136 to be received, while the data center firewall 416 may be configured to allow incoming network traffic emanating from the CMS aggregator 128 to be received.

In various embodiments, a particular CMS aggregator 128 may be implemented in combination with a particular CMS client 136 to provide a split proxy that allows an associated data center asset 244 to securely communicate with a data center monitoring and management console 118. In various embodiments, the split proxy may be implemented in a client/server configuration. In certain of these embodiments, the CMS client 136 may be implemented as the client component of the client/server configuration and the CMS aggregator 128 may be implemented as the server component. In certain of these embodiments, one or more connectivity management operations may be respectively performed by the CMS aggregator 128 and the CMS client 136 to establish a secure tunnel connection 418 through a particular network 140, such as the Internet.

In various embodiments, the secure tunnel connection 418 may be initiated by the CMS client 136 first determining the address of the CMS aggregator 128 it intends to connect to. In these embodiments, the method by which the address of the CMS aggregator 128 is determined is a matter of design choice. Once the address of the CMS aggregator 128 is determined, the CMS client 136 uses it to establish a secure Hypertext Transport Protocol (HTTPS) connection with the CMS aggregator 128 itself.

In response, the CMS aggregator 128 sets its HTTPS Transport Layer Security (TLS) configuration to "request TLS certificate" from the CMS client 136, which triggers the CMS client 136 to provide its requested TLS certificate 408. In certain embodiments, the CMS authentication 426 service may be implemented to generate and provision the TLS certificate 408 for the CMS client 136. In certain embodiments, the CMS client 136 may be implemented to generate a self-signed TLS certificate if it has not yet been provisioned with one from the CMS authentication 426 service.

In various embodiments, the CMS client 136 may then provide an HTTP header with a previously-provisioned authorization token. In certain embodiments, the authorization token may have been generated and provisioned by the CMS authentication 426 service once the CMS client has been claimed. As used herein, a claimed CMS client 136 broadly refers to a particular CMS client 136 that has been bound to an account associated with a user, such as a customer, of one or more data center services 432 provided by the data center monitoring and management console 118.

In certain embodiments, a CMS client 136 may be implemented to maintain its claimed state by renewing its certificate 408 and being provided an associated claim token. In these embodiments, the frequency, or conditions under which, a CMS client's certificate 408 is renewed, or the method by which it is renewed, or both, is a matter of design choice. Likewise, in these same embodiments, the frequency, or conditions under which, an associated claim token is generated, or the method by which it is provided to a CMS client 136, or both, is a matter of design choice.

In various embodiments, the CMS client 136 may be implemented to have a stable, persistent, and unique identifier (ID) after it is claimed. In certain of these embodiments, the CMS client's 136 unique ID may be stored within the authorization token. In these embodiments, the method by the CMS client's 136 unique ID is determined, and the method by which it is stored within an associated authorization token, is a matter of design choice.

Once the CMS client 136 has been claimed, it may be implemented to convert the HTTPS connection to a Websocket connection, familiar to those of skill in the art. After the HTTP connection has been converted to a Websocket connection, tunnel packet processing is initiated and the CMS aggregator 128 may then perform a Representational State Transfer (REST) to request the CMS client 136 to validate its certificate 408. In certain embodiments, the validation of the CMS client's 136 certificate 408 is performed by the CMS authorization 430 service.

In various embodiments, the validation of the CMS client's 136 certificate 408 is performed to determine a trust level for the CMS client 136. In certain of these embodiments, if the CMS client's 136 certificate 408 is validated, then it is assigned a "trusted" classification. Likewise, if CMS client's 136 certificate 408 fails to be validated, then it is assigned an "untrusted" classification.

Accordingly, certain embodiments of the invention reflect an appreciation that "trusted" and "claimed," as used herein as they relate to a CMS client 136 are orthogonal. More specifically, "trust" means that the channel of communication can be guaranteed. Likewise, "claimed" means the CMS client 136 can be authenticated and bound to a user, or customer, of one or more data center services 432 provided by the data center monitoring and management console 118.

In various embodiments, the resulting secure tunnel connection 418 may be implemented to provide a secure channel of communication through a data center firewall 416 associated with a particular data center 402 and a service provider firewall 420 associated with a particular data center monitoring and management console 118. In various embodiments, the CMS client 136, the secure tunnel connection 418, and the CMS aggregator 128 may be implemented to operate at the application level of the Open Systems Interconnection (OSI) model, familiar to those of skill in the art. Skilled practitioners of the art will likewise be aware that known approaches to network tunneling typically use the network layer of the OSI model. In certain embodiments, the CMS client 136 and the CMS aggregator 128 may be implemented to send logical events over the secure tunnel connection 418 to encapsulate and multiplex individual connection streams and associated metadata.

In various embodiments, the CMS discovery 424 service may be implemented to identify certain data center assets 244 to be registered and managed by the data center monitoring and management console 118. In various embodiments, the CMS discovery 424 service may be implemented to detect certain events published by a CMS aggregator 128. In certain embodiments, the CMS discovery 424 service may be implemented to maintain a database (not shown) of the respective attributes of all CMS aggregators 128 and CMS clients 136. In certain embodiments, the CMS discovery 424 service may be implemented to track the relationships between individual CMS clients 136 and the CMS aggregators 128 they may be connected to.

In various embodiments, the CMS discovery 424 service may be implemented to detect CMS client 136 connections and disconnections with a corresponding CMS aggregator 128. In certain of these embodiments, a record of such connections and disconnections is stored in a database (not shown) associated with the CMS inventory 428 service. In various embodiments, the CMS discovery 424 service may be implemented to detect CMS aggregator 128 start-up and shut-down events. In certain of these embodiments, a record of related Internet Protocol (IP) addresses and associated state information is stored in a database (not shown) associated with the CMS inventory 428 service.

In various embodiments, the CMS authentication 426 service may be implemented to include certain certificate authority (CA) capabilities. In various embodiments, the CMS authentication 426 service may be implemented to generate a certificate 408 for an associated CMS client 136. In various embodiments, the CMS authentication 426 service may be implemented to use a third party CA for the generation of a digital certificate for a particular data center asset 244. In certain embodiments, the CMS inventory 428 service may be implemented to maintain an inventory of each CMS aggregator 128 by an associated unique ID. In certain embodiments, the CMS inventory 428 service may likewise be implemented to maintain an inventory of each CMS client 136 by an associated globally unique identifier (GUID).

In various embodiments, the CMS authorization 430 service may be implemented to authenticate a particular data center asset 244 by requesting certain proof of possession information, and then processing it once it is received. In certain of these embodiments, the proof of possession information may include information associated with whether or not a particular CMS client 136 possesses the private keys corresponding to an associated certificate 408. In various embodiments, the CMS authorization 430 service may be implemented to authenticate a particular CMS client 136 associated with a corresponding data center asset 244. In certain of these embodiments, the CMS authorization 430 service may be implemented to perform the authentication by examining a certificate 408 associated with the CMS client 136 to ensure that it has been signed by the CMS authentication 426 service.

In various embodiments, the service mesh proxy 434 may be implemented to integrate knowledge pertaining to individual data center assets 244 into a service mesh such that certain data center services 432 have a uniform method of transparently accessing them. In various embodiments, the service mesh proxy 434 may be implemented with certain protocols corresponding to certain data center assets 244. In certain embodiments, the service mesh proxy 434 may be implemented to encapsulate and multiplex individual connection streams and metadata over the secure tunnel connection 418. In certain embodiments, these individual connection streams and metadata may be associated with one or more data center assets 244, one or more data center services 432, one or more CMS clients 136, and one or more CMS aggregators 128, or a combination thereof.

Figure 5A:
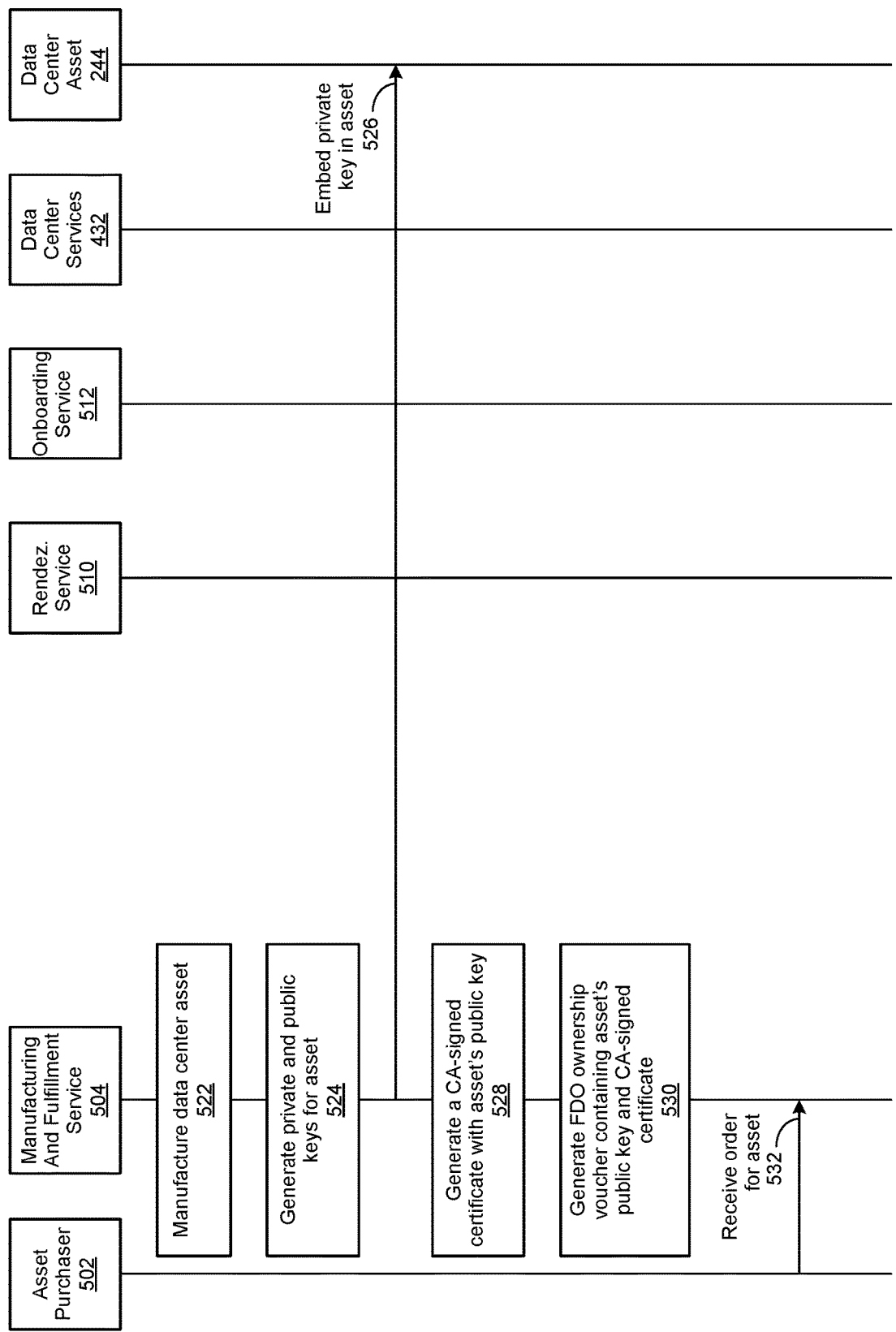
FIGS. 5a through 5c are a sequence diagram showing certain onboarding operations performed for zero-touch, secured onboarding of a data center asset.
Figure 5B:
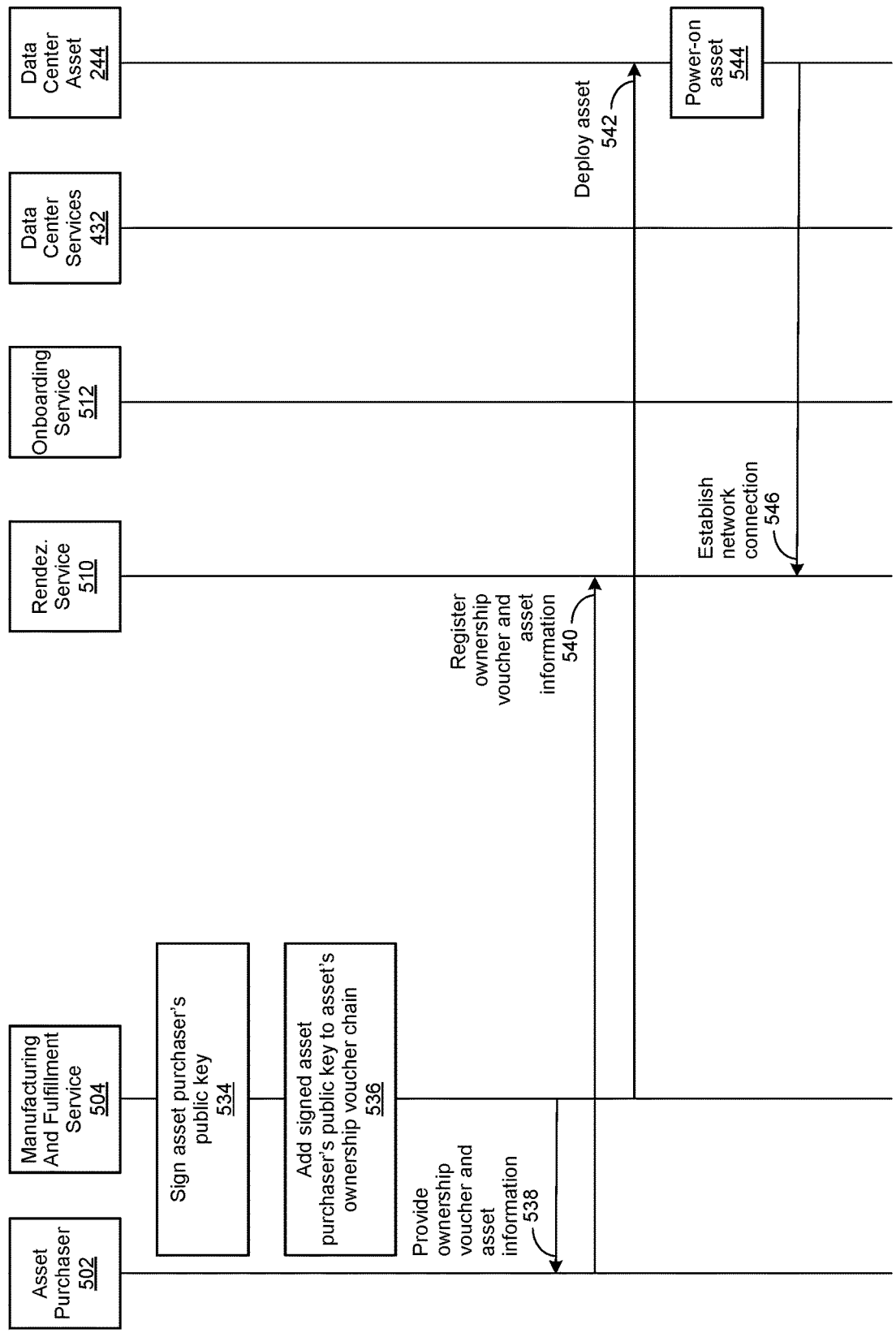
Figure 5C:
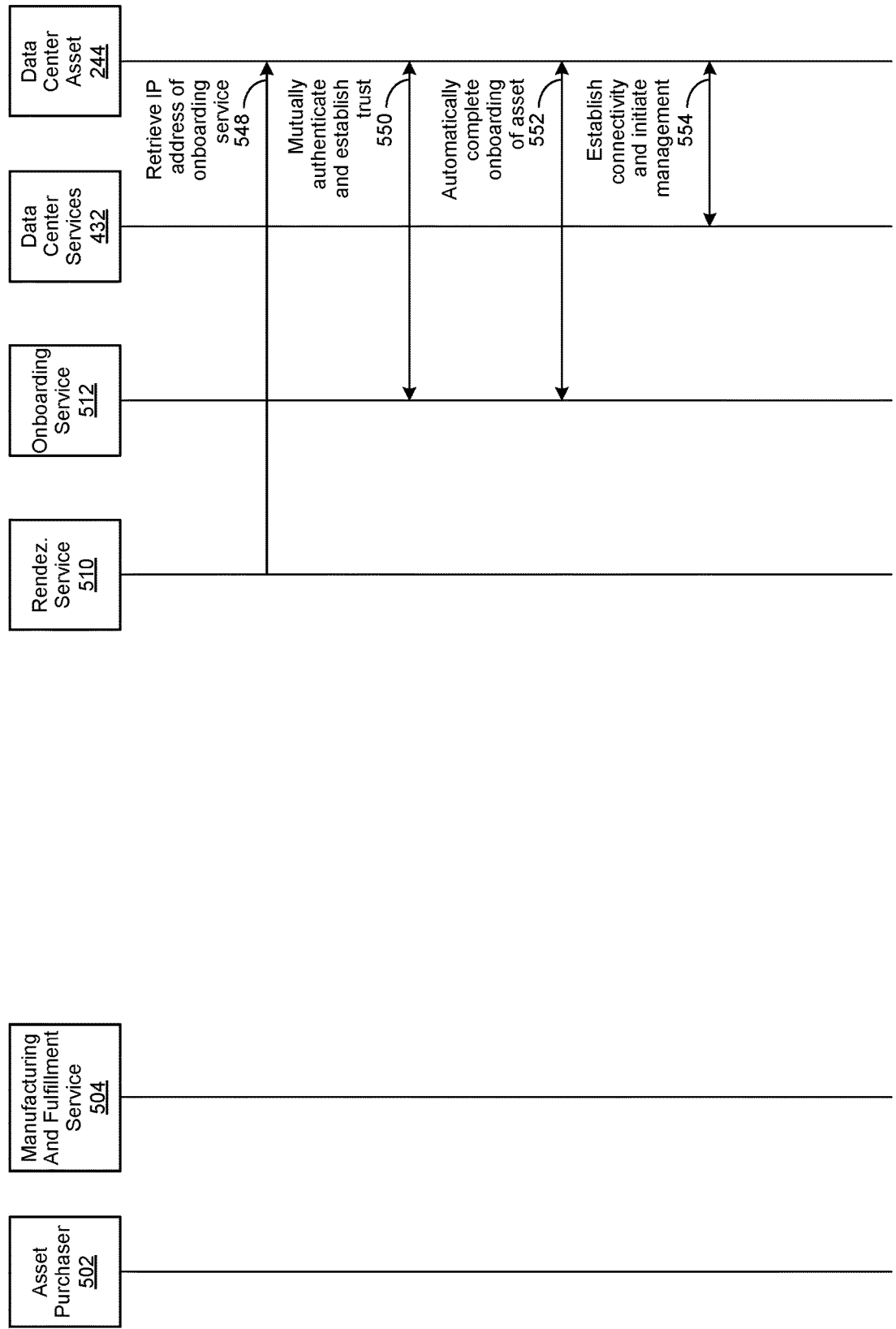
Figure 6A:
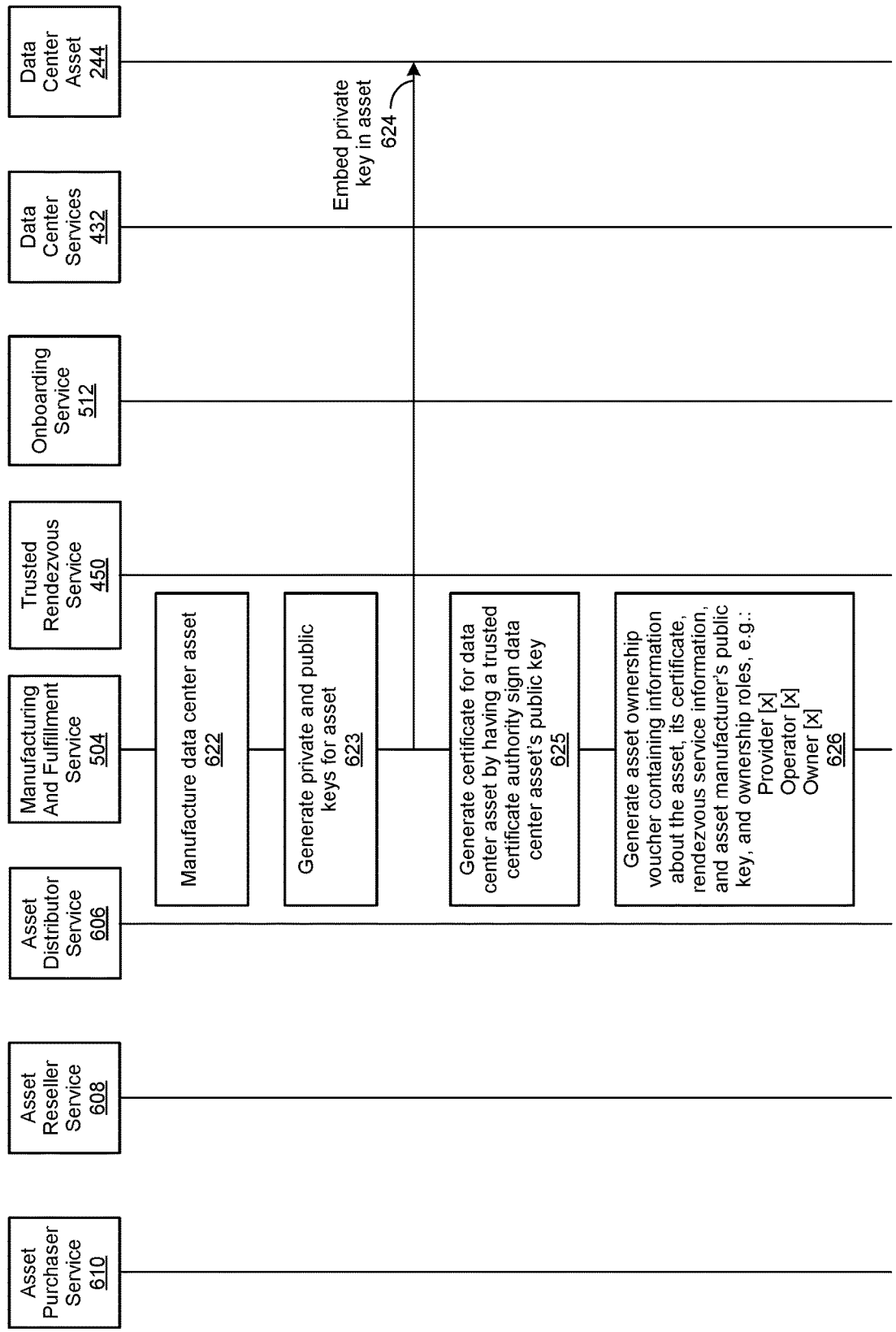
FIGS. 6a through 6i are a sequence diagram showing certain ownership transfer operations.
Figure 6B:
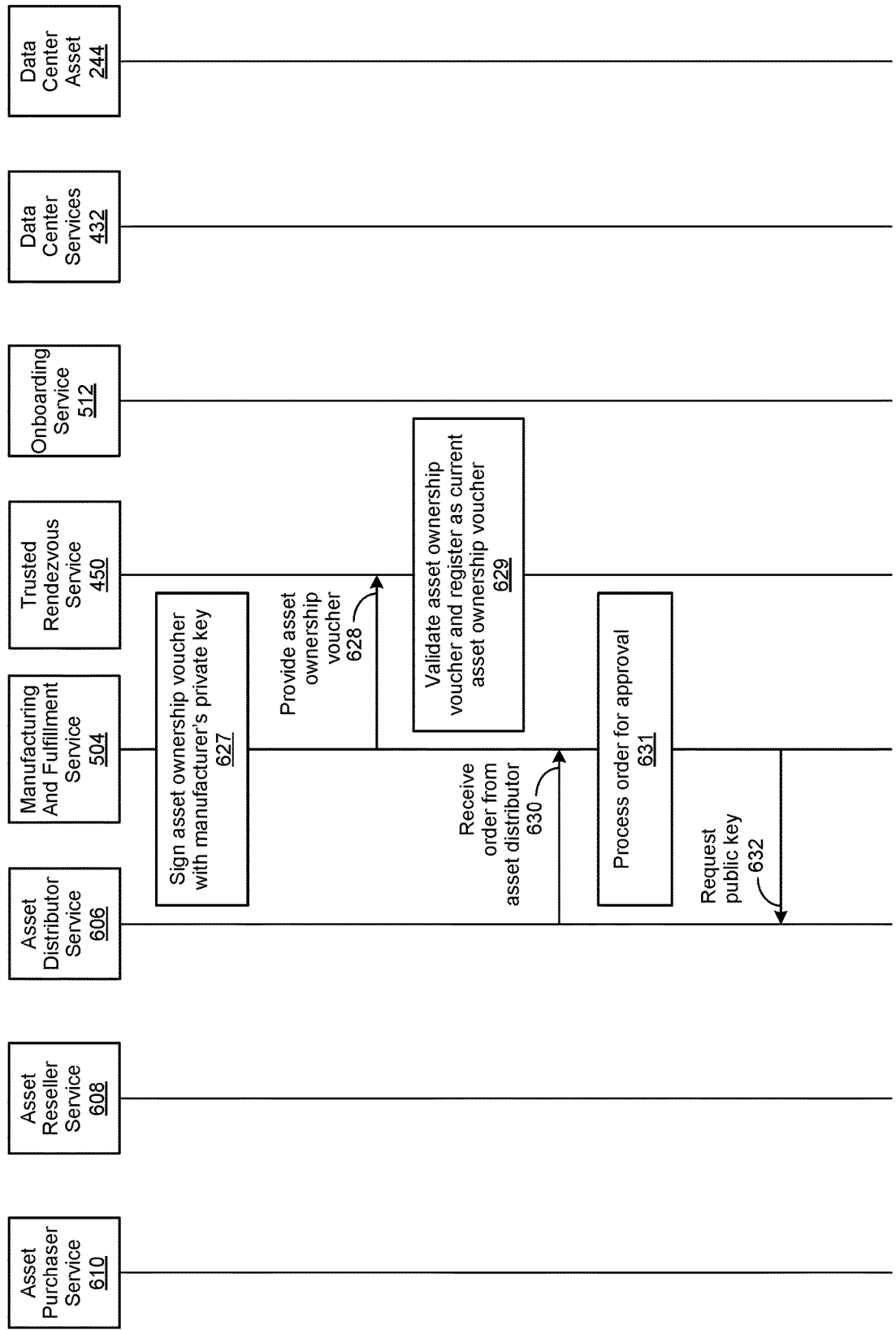
Figure 6C:
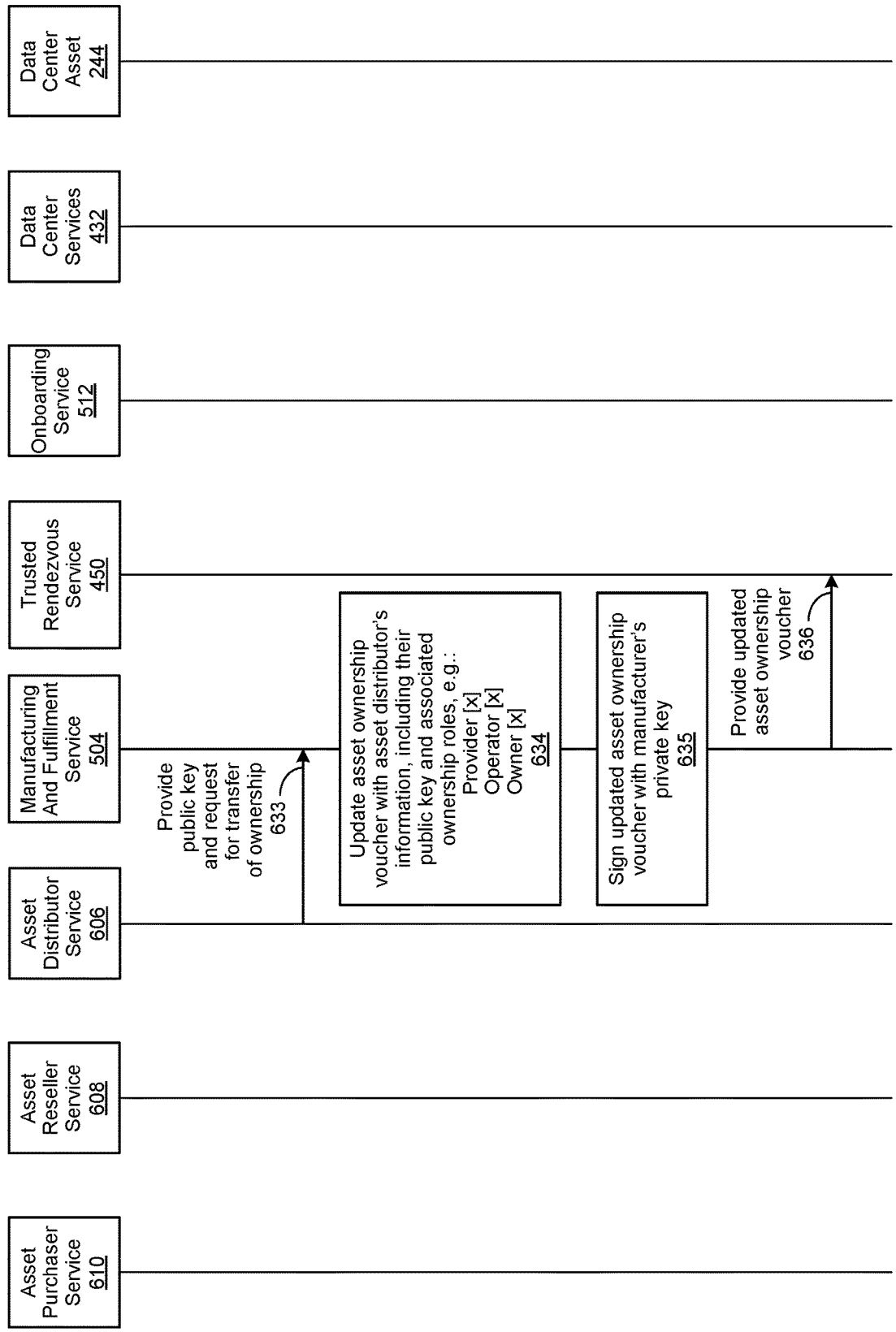
Figure 6D:
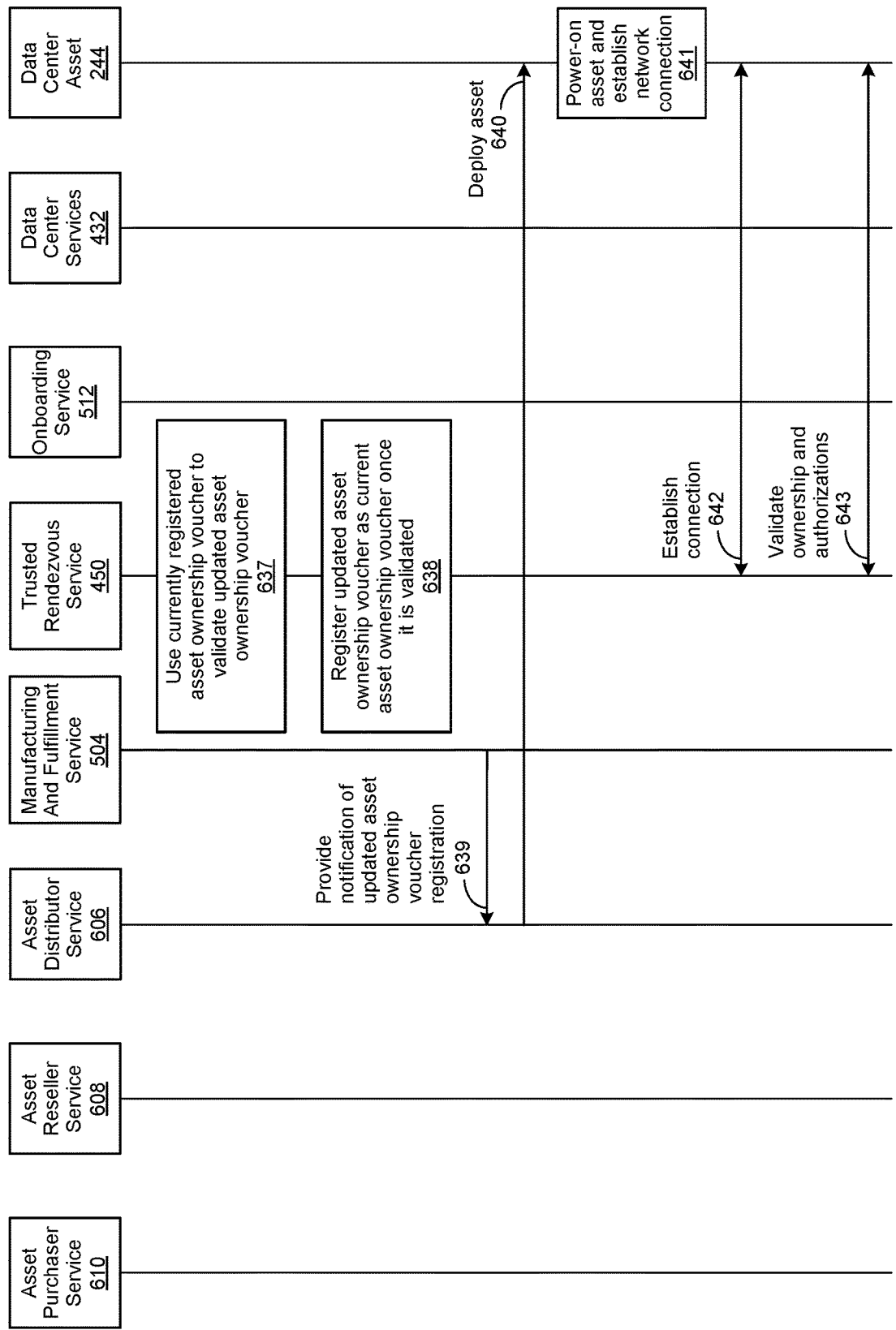
Figure 6E:
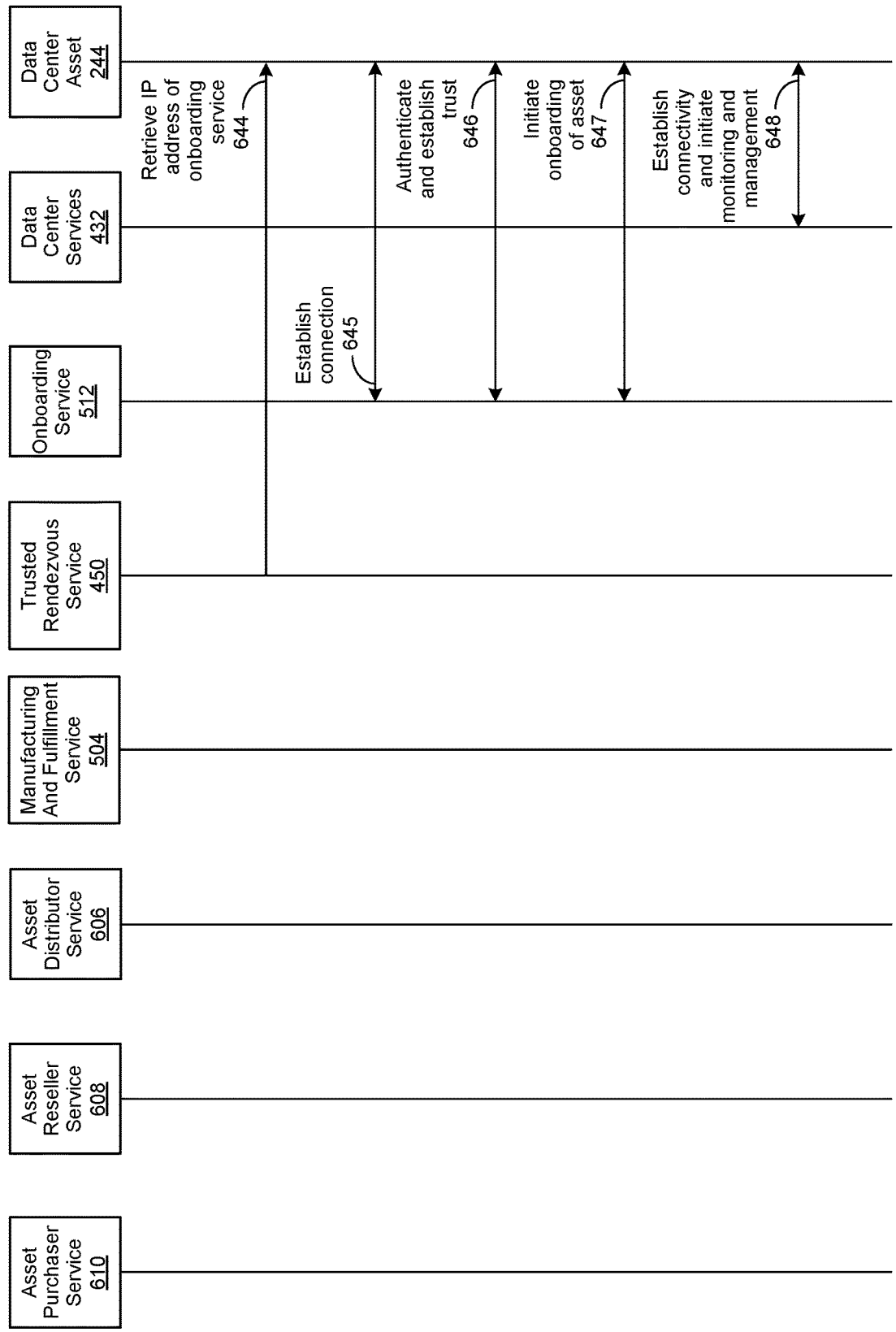
Figure 6F:
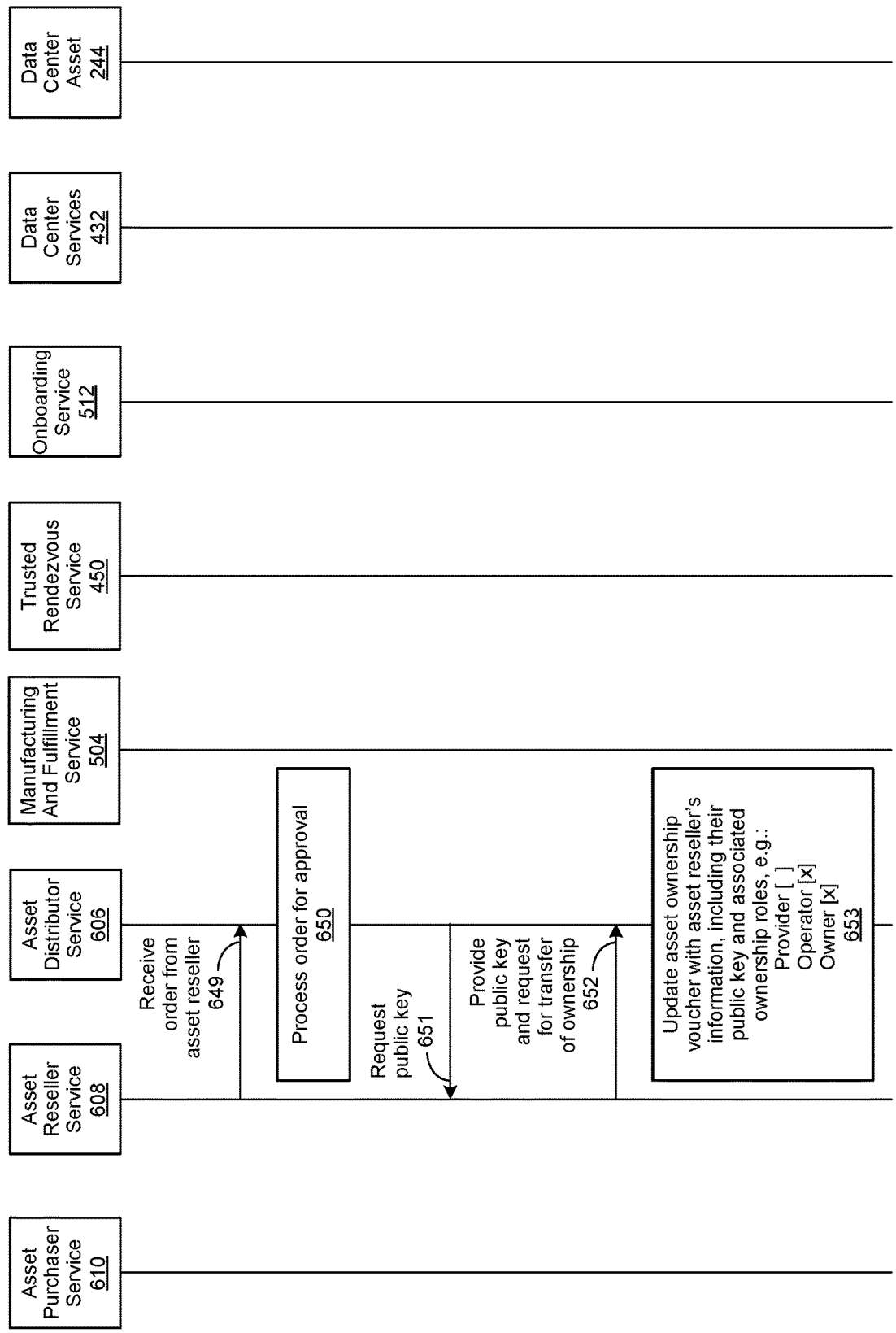
Figure 6G:
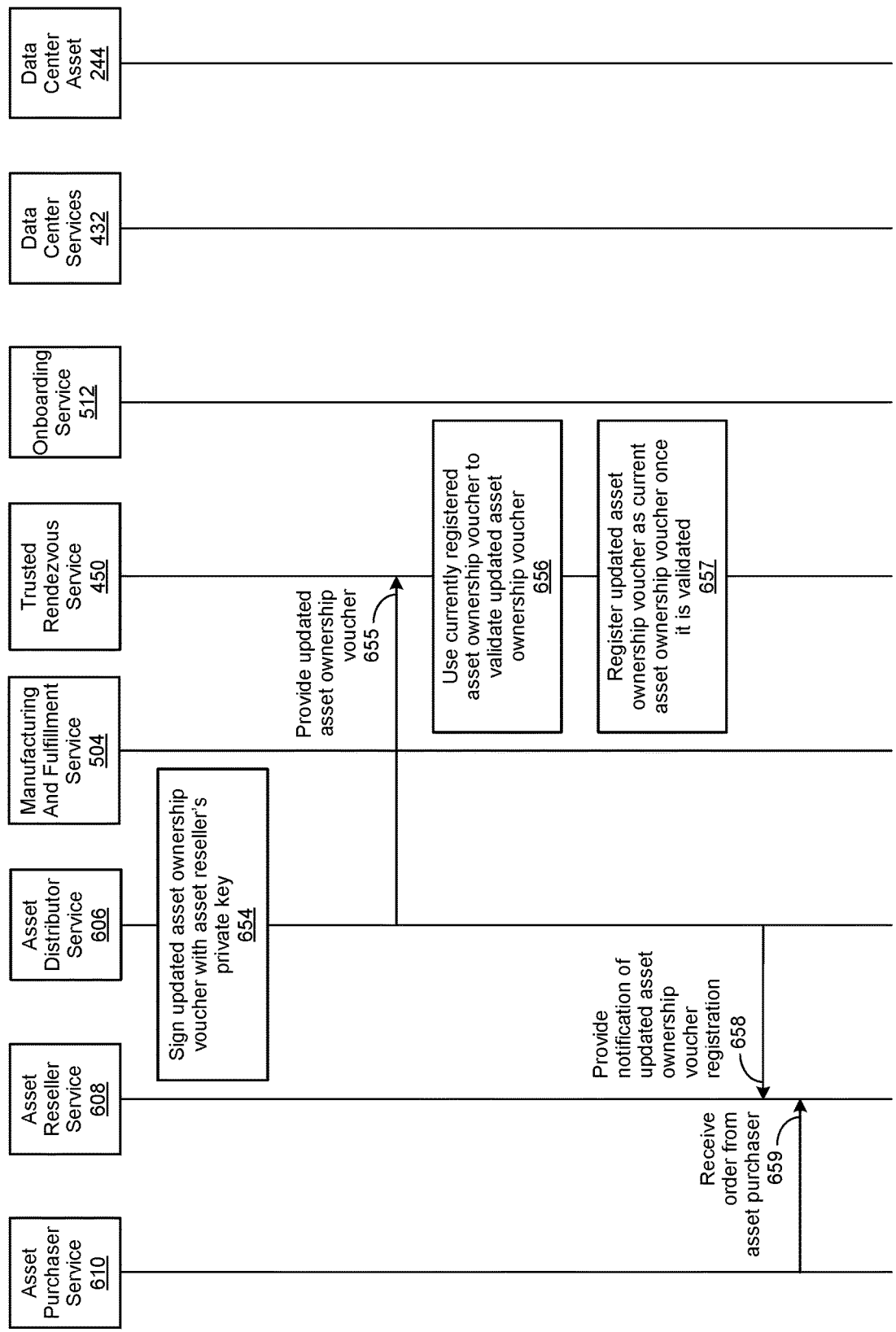
Figure 6H:
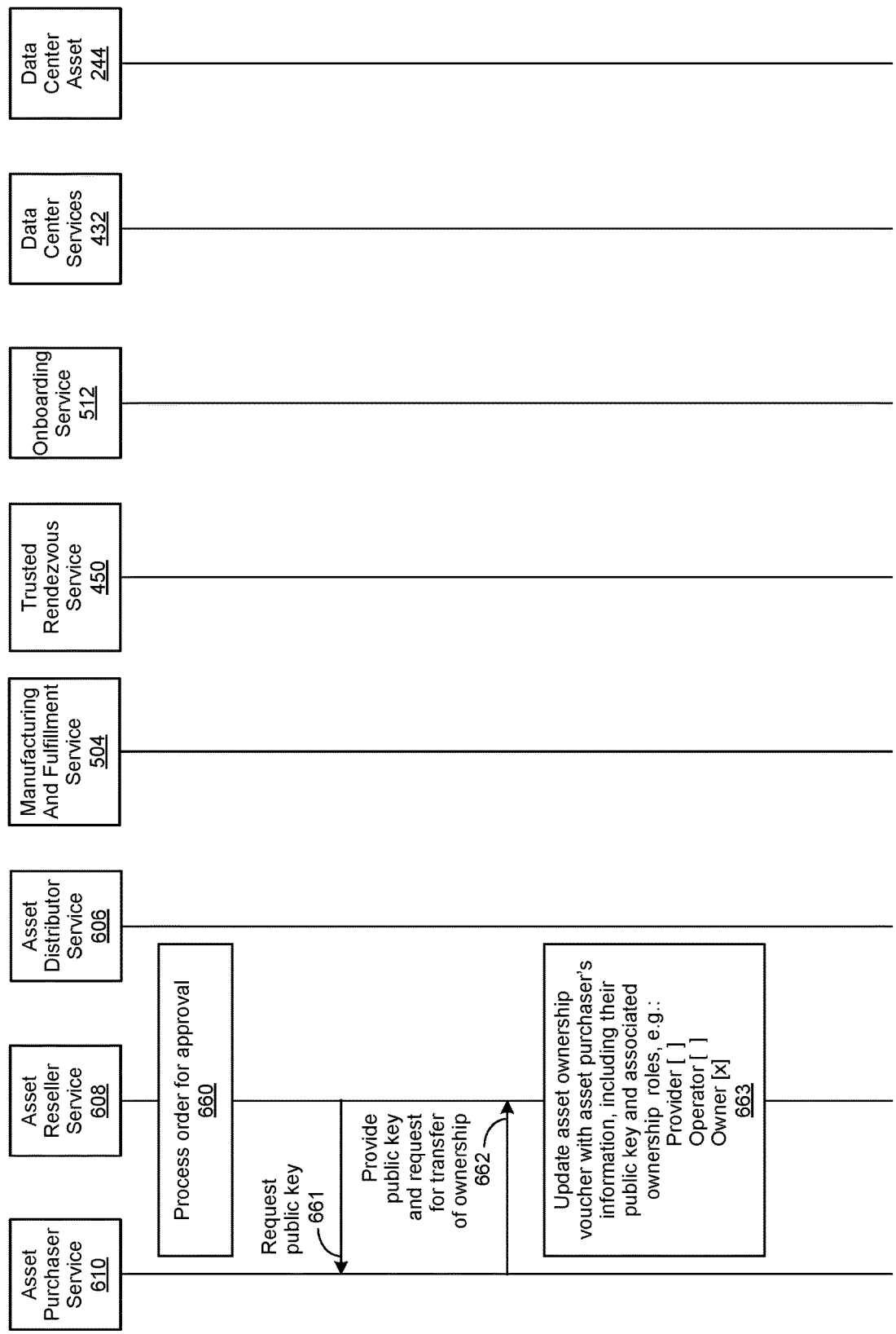
Figure 6I:
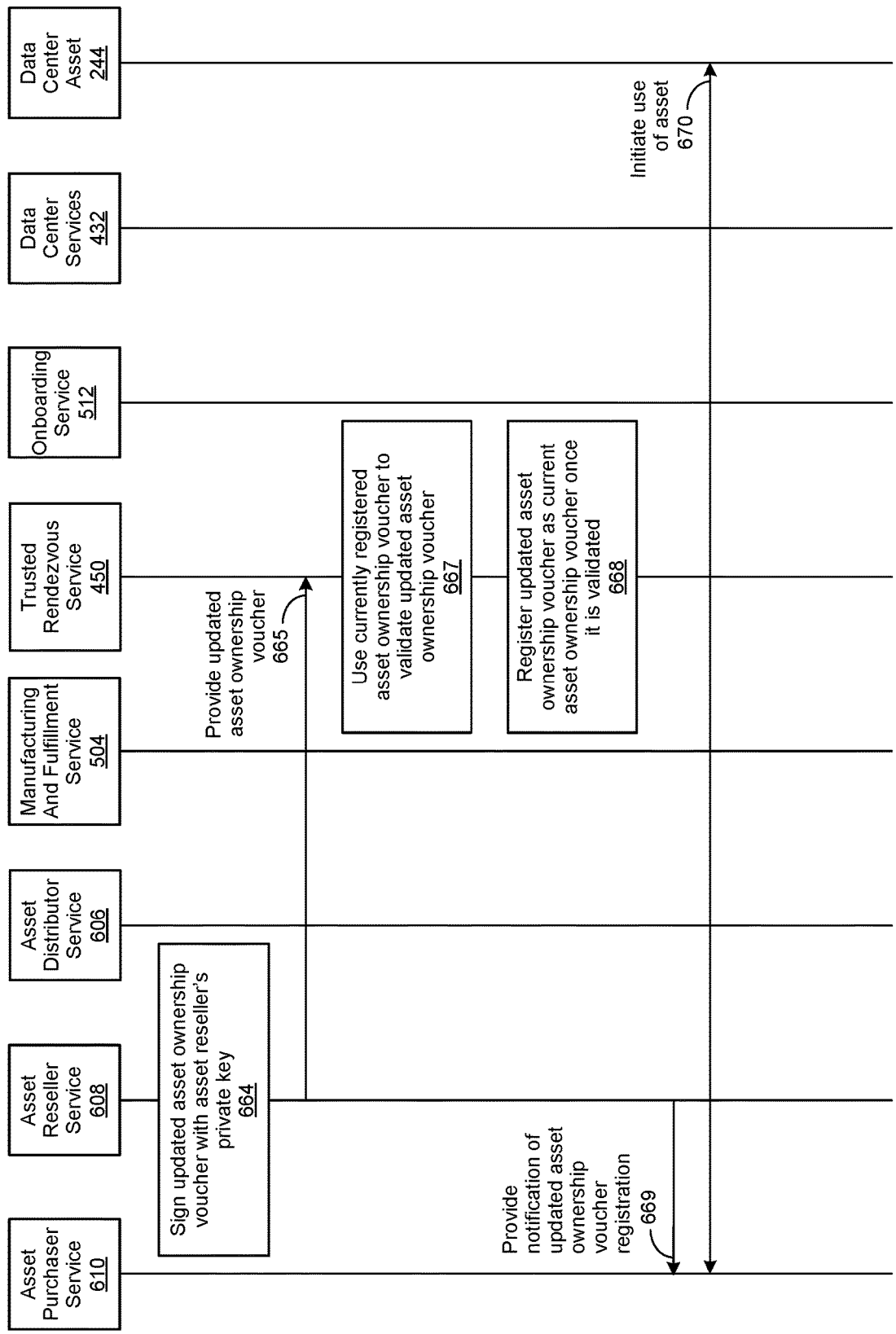

FIGS. 5a through 5c are a sequence diagram showing certain onboarding operations performed in accordance with an embodiment of the invention for zero-touch, secured onboarding of a data center asset. As used herein, zero-touch, as it relates to onboarding a data center asset, broadly refers to preconfiguring a data center asset such that it can be onboarded, provisioned, and deployed without the need for a technician to manually configure the asset in person. In various embodiments, a manufacturing and fulfillment service 504 may be used in the manufacture 522 of a particular data center asset 244. In certain of these embodiments, an asset configuration system, a product configuration system, a product fabrication system, and a supply chain system, each of which is described in greater detail herein, may be implemented, individually or in combination with one another, to provide the manufacturing and fulfillment service 504.

In various embodiments, the manufacturing and fulfillment service 504 may be implemented to generate 524 private and public keys, familiar to skilled practitioners of the art, for the data center asset 244. In various embodiments, the previously-generated 524 private key may be embedded 526 in the data center asset 244 by the manufacturing and fulfillment service 504. In certain of these embodiments, the private key may be embedded 526 in a trusted platform module (TPM) associated with the data center asset 244.

In various embodiments, the manufacturing and fulfillment service 504 may be implemented to use the previously-generated 524 public key and certificate signed by a trusted certificate authority (CA) to generate 528 a CA-signed certificate. In various embodiments, the manufacturing and fulfillment service 504 may be implemented to then generate 530 an FDO ownership voucher, described in greater detail herein, containing the data center asset's 244 public key and the previously-generated CA-signed certificate. In various embodiments, an order for the data center asset 244 may then be received 532 by the manufacturing and fulfillment service 504.

In various embodiments, the manufacturing and fulfillment service 504 may be implemented to use the data center asset manufacturer's private key to sign 534 the data center asset purchaser's 502 public key. In these embodiments, the method by which the data center asset purchaser's 502 public key is determined, and the method by which it is signed 534, is a matter of design choice. In various embodiments, the manufacturing and fulfillment service 504 may be implemented to then add 536 the signed asset purchaser's public key to the previously-generated asset ownership voucher chain. In certain of these embodiments, the addition 536 of the signed asset purchaser's public key to the previously-generated ownership voucher chain may result in ownership of the data center asset 255 being transferred from the manufacturing and fulfillment service 504 to the data center asset purchaser 502.

In various embodiments, the manufacturing and fulfillment service 504 may be implemented to then provide 538 certain information related to the data center asset 244, and its associated voucher chain, to the data center asset purchaser 502. In various embodiments, the data center asset purchaser 502 may then register 540 the previously-provided information related to the data center asset 244, and its associated voucher chain, with a particular rendezvous service 510. In certain of these embodiments, the rendezvous service 510 may be provided by a particular rendezvous server, described in greater detail herein. In certain embodiments, the rendezvous server provides a trusted third part which participates in an ownership transfer operation between a current owner of a data center asset and a prospective owner of the data center asset.

In various embodiments, the manufacturing and fulfillment service 504 may be implemented to deploy 542 the data center asset 244. In these embodiments the method by which the manufacturing and fulfillment service 504 may be implemented to deploy 542 the data center asset 244 is a matter of design choice. In various embodiments, the data center asset 244 may then be powered-on 544, followed by establishing 546 a network connection to a particular rendezvous service 510.

In various embodiments, the data center asset 244 may be implemented to retrieve the Internet Protocol (IP) address of the onboarding service 512 associated with the current owner of the data center asset 244. In certain of these embodiments, the data center asset 244 may be implemented to use the retrieved IP address to establish network connectivity with the onboarding service 512, and once it has done so, establish 552 mutual authentication and trust. In various embodiments, the data center asset 244 may then be implemented to interact with the data center asset onboarding service 130 to automatically complete its onboarding 552. In various embodiments, data center asset monitoring and management operations, described in greater detail herein, may then be initiated 554 with one or more data center services 432, likewise described in greater detail herein.

FIGS. 6a through 6i are a sequence diagram showing certain ownership transfer operations performed in accordance with an embodiment of the invention. In various embodiments, one or more ownership transfer operations, described in greater detail herein, may be performed to certify the transfer of ownership of a data center asset 244 from its current owner to a prospective owner. In various embodiments, a manufacturing and fulfillment service 504 may be used in the manufacture 622 of a particular data center asset 244. In certain of these embodiments, an asset configuration system, a product configuration system, a product fabrication system, and a supply chain system, each of which is described in greater detail herein, may be implemented, individually or in combination with one another, to provide the manufacturing and fulfillment service 504.

In various embodiments, the manufacturing and fulfillment service 504 may be implemented to generate 623 private and public keys, familiar to skilled practitioners of the art, for the data center asset 244. In various embodiments, the previously-generated 623 private key may be embedded 624 in the data center asset 244 by the manufacturing and fulfillment service 504. In certain of these embodiments, the private key may be embedded 624 in a trusted platform module (TPM), likewise familiar to those of skill in the art, associated with the data center asset 244.

In various embodiments, the manufacturing and fulfillment service 504 may be implemented to generate 625 a certificate for the data center asset 244 by having a trusted certificate authority (CA) sign the data center asset's 244 previously-generated 623 public key. In various embodiments, the manufacturing and fulfillment service 504 may be implemented to then generate 626 an asset ownership voucher. In various embodiments, the asset ownership voucher may be based upon the Fast Identity Online (FIDO) Alliance's FIDO Device Onboard (FDO) ownership voucher, described in greater detail herein. In various embodiments, the asset ownership voucher may be implemented to include certain extensions to the FDO ownership voucher. In various embodiments, the resulting asset ownership voucher may be implemented to contain certain information about the data center asset 244, such as a globally unique identifier (GUID), its public key, its previously-generated CA-signed certificate, and so forth.

In various embodiments, the asset ownership voucher may be implemented to likewise contain the data center asset 244 manufacturer's public key, as well as certain authorizations associated with the ownership and use of the data center asset 244. In various embodiments, the authorizations may include certain ownership roles, such as provider, operator, owner, and so forth. In various embodiments, the provider ownership role may be implemented to authorize the onboarding of an associated data center asset 244 by its current owner. Conversely, the provider ownership role may be implemented in certain embodiments to restrict or prevent the onboarding of an associated data center asset by its current owner.

In various embodiments, the operator ownership role may be implemented to authorize the operation of an associated data center asset 244 by its current owner. In various embodiments, such operation may include the performance of certain data center asset monitoring and management operations, described in greater detail herein. In various embodiments, the owner ownership role may be implemented to confirm the ownership of the data center asset 244. In various embodiments, the owner ownership role may be implemented to include certain authorizations to use the data center asset 244 within a data center system monitoring and management environment, likewise described in greater detail herein. Skilled practitioners of the art will recognize that many such ownership roles are possible. Accordingly, the foregoing is not intended to limit the spirit, scope, or intent of the invention.

In various embodiments, the manufacturing and fulfillment service 504 may be implemented to sign 627 the previously-generated asset ownership voucher with a private key associated with the manufacturer of the data center asset 244. In various embodiments, the manufacturing and fulfillment service 504 may be implemented to provide 628 the signed asset ownership voucher to a trusted rendezvous service 450, described in greater detail. In various embodiments, the trusted rendezvous service 450 may be implemented to validate the provided asset ownership voucher and register 629 it as the current asset ownership voucher.

In various embodiments, the manufacturing and fulfillment service 504 may be implemented to receive 630 an order for a particular data center asset 244 from a data center asset distributor. In certain of these embodiments, the order for the data center asset 244 may be received from a service 606 associated with the data center asset distributor. In various embodiments, the manufacturing and fulfillment service 504 may be implemented to process 631 the order for approval. In various embodiments, the manufacturing and fulfillment service 504 may then be implemented to request 632 the datacenter asset distributor service 606 provide their public key. In various embodiments, the data center asset distributor service 606 may provide 633 the requested public key along with a request to transfer ownership of the data center asset 244.

In various embodiments, the manufacturing and fulfillment service 504 may be implemented to update 634 certain information in the asset ownership voucher associated with the data center asset 244 ordered 630 by the data center asset distributor service 606. In various embodiments, the updated information may include the data center asset distributor service's 606 public key and associated ownership roles. In various embodiments, the manufacturing and fulfillment service 504 may be implemented to revise certain authorizations in the asset authorization voucher corresponding to the ownership roles associated with the data center asset distributor service 606. In various embodiments, the manufacturing and fulfillment service 504 may be implemented to use a private key associated with the manufacturer of the data center asset 244 to sign 635 the updated asset ownership voucher.

In various embodiments, the manufacturing and fulfillment service 504 may be implemented to provide 636 the updated asset ownership voucher to a trusted rendezvous service 450. In various embodiments, the trusted rendezvous service 450 may be implemented to use the currently-registered asset ownership voucher for the previously-ordered data center asset 244 to validate 637 the updated asset ownership voucher. In various embodiments, the trusted rendezvous service 450 may then be implemented to register 638 the updated asset ownership voucher as the current asset ownership voucher once it has been validated. In certain embodiments, the trusted rendezvous service 450 maintains a record of the ownership transfers of the data center asset. In certain embodiments, the record of the ownership transfers includes maintaining a record of the asset ownership voucher and the updated ownership vouchers associated with a particular data center asset to provide a chain of custody for the ownership transfers of the data center asset.

In various embodiments, the manufacturing and fulfillment service 504 may be implemented to provide 639 notification of the registration of the updated asset ownership voucher to the data center asset distributor service 606. In various embodiments, the data center asset distributor service 606 may deploy 640 the data center asset 244 once it has been provided 639 notification of the registration of the updated asset ownership voucher. In these embodiments, the method by which the data center asset 244 may be deployed 640 by the data center asset distributor service 606 is a matter of design choice.

In various embodiments, the data center asset 244 may be powered-on 641, and a network connection established, during its deployment 640. In various embodiments, the data center asset 244 may then be implemented to establish 642 a network connection to the trusted rendezvous service 450. In various embodiments, the trusted rendezvous service 450 may be implemented to validate 643 the ownership and associated authorizations of the data center asset 244. In various embodiments, the data center asset 244 may be implemented to retrieve 644 the Internet Protocol (IP) address of the onboarding service 512 associated with the data center asset distributor service 606 once a network connection to the trusted rendezvous service 450 has been established 642.

In various embodiments, the data center asset 244 may then be implemented to establish 645 a network connection to the onboarding service 512 associated with the data center asset distributor service 606. In various embodiments, the data center asset 244, and the onboarding service 512, may be respectively implemented to mutually authenticate themselves to one another and establish a basis of trust 646 for the exchange of onboarding information. In various embodiments, the data center asset 244, and the onboarding service 512, may be respectively implemented to initiate 647 the onboarding of the data center asset 244. In various embodiments, the data center asset 244, and the one or more data center services 432, may then be implemented to establish connectivity and initiate data center monitoring and management operations, described in greater detail herein.

In various embodiments, the data center asset distributor service 606 may be implemented to receive 649 an order for a particular data center asset 244 from a data center asset reseller. In certain of these embodiments, the order for the data center asset 244 may be received 649 from a service 608 associated with the data center asset reseller. In various embodiments, the data center asset distributor service 606 may be implemented to process 650 the order for approval. In various embodiments, data center asset distributor service 606 may then be implemented to request 651 the datacenter asset reseller service 608 provide their public key. In various embodiments, the datacenter asset reseller service 608 may provide 652 the requested public key along with a request to transfer ownership of the data center asset 244.

In various embodiments, the data center asset distributor service 606 may be implemented to update 653 certain information in the asset ownership voucher associated with the data center asset 244 ordered by the data center asset reseller service 608. In various embodiments, the updated information may include the data center asset reseller's public key and associated ownership roles. In various embodiments, the data center asset distributor service 606 may be implemented to revise certain authorizations in the asset authorization voucher corresponding to the ownership roles associated with the data center asset reseller. In various embodiments, the data center asset distributor service 606 may be implemented to use a private key associated with the manufacturer of the data center asset 244 to sign 634 the updated asset ownership voucher.

In various embodiments, the data center asset distributor service 606 may be implemented to provide 655 the updated asset ownership voucher to a trusted rendezvous service 450. In various embodiments, the trusted rendezvous service 450 may be implemented to use the currently-registered asset ownership voucher for the previously-ordered data center asset 244 to validate 656 the updated asset ownership voucher. In various embodiments, the trusted rendezvous service 450 may then be implemented to register 657 the updated asset ownership voucher as the current asset ownership voucher once it has been validated. In certain embodiments, the trusted rendezvous service 450 maintains a record of the updated ownership voucher to provide a chain of custody for the ownership transfers of the data center asset. In various embodiments, the data center asset distributor service 606 may be implemented to provide 658 notification of the registration of the updated asset ownership voucher to the data center asset reseller service 608.

In various embodiments, the data center asset reseller service 608 may be implemented to receive 659 an order for a particular data center asset 244 from a data center asset purchaser. In certain of these embodiments, the order for the data center asset 244 may be received 659 from a service 610 associated with the data center asset purchaser. In various embodiments, the data center asset reseller service 608 may be implemented to process 660 the order for approval. In various embodiments, data center asset reseller service 608 may then be implemented to request 661 the datacenter asset purchaser service 610 provide their public key. In various embodiments, the datacenter asset purchaser service 610 may provide 662 the requested public key along with a request to transfer ownership of the data center asset 244.

In various embodiments, the data center asset reseller service 608 may be implemented to update 663 certain information in the asset ownership voucher associated with the data center asset 244 ordered by the data center asset purchaser service 610. In various embodiments, the updated information may include the data center asset purchaser's public key and associated ownership roles. In various embodiments, the data center asset reseller service 608 may be implemented to revise certain authorizations in the asset authorization voucher corresponding to the ownership roles associated with the data center asset purchaser. In various embodiments, the data center asset reseller service 608 may be implemented to use a private key associated with the reseller of the data center asset 244 to sign 664 the updated asset ownership voucher.

In various embodiments, the data center asset reseller service 608 may be implemented to provide 665 the updated asset ownership voucher to a trusted rendezvous service 450. In various embodiments, the trusted rendezvous service 450 may be implemented to use the currently-registered asset ownership voucher for the previously-ordered data center asset 244 to validate 667 the updated asset ownership voucher. In various embodiments, the trusted rendezvous service 450 may then be implemented to register 668 the updated asset ownership voucher as the current asset ownership voucher once it has been validated. In certain embodiments, the trusted rendezvous service 450 maintains a record of the updated ownership vouchers to provide a chain of custody for the ownership transfers of the data center asset.

In various embodiments, the data center asset reseller service 608 may be implemented to provide 669 notification of the registration of the updated asset ownership voucher to the data center asset purchaser service 610. In various embodiments, the asset purchaser service 610 may be implemented to initiate 670 use of the data center asset 244 once it has received notification of the registration of the updated asset ownership voucher. Those of skill in the art will recognize that many such embodiments are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    providing the data center asset to a prospective owner;
    establishing a secure communication channel between an onboarding system and the data center asset;
    establishing a second communication channel between a rendezvous server and the data center asset, the rendezvous server functioning as a rendezvous point between a newly powered-on data center asset and an onboarding service, the rendezvous server executing a trusted rendezvous service, the trusted rendezvous service being implemented to validate and register data center assets;
    exchanging information between the onboarding system and the data center asset via the secure communication channel, the information including a data center asset ownership voucher, the data center asset ownership voucher comprising a structured digital document that links the data center asset with an owner;
    maintaining the data center asset ownership voucher at the rendezvous server; and,
    using the data center asset ownership voucher to associate the data center asset with the prospective owner.

2. The method of claim 1, wherein:
    the using the data center asset voucher to associate the data center asset to the customer conforms to a Fast Identity Online (FIDO) Alliance FIDO Device Onboard (FDO) specification.

3. The method of claim 1, further comprising:
    performing an ownership transfer operation, the ownership transfer operation securely transferring ownership from a current owner of the data center asset to the prospective owner of the data center asset.

4. The method of claim 3, wherein:
    the ownership transfer operation allows only an authorized owner of the data center asset to onboard the data center asset when the authorized owner has an associated provider role.

5. The method of claim 3, further comprising:
    the ownership transfer operation includes providing an updated data center asset ownership voucher to the rendezvous server;
    registering the updated data center asset ownership voucher with the rendezvous server as a current data center asset ownership voucher.

6. The method of claim 1, wherein:
    the rendezvous server provides a rendezvous point between the data center asset and the data center asset ownership voucher when the data center asset is newly powered on.

7. A system comprising:
    a processor;
    a data bus coupled to the processor; and,
    a non-transitory, computer-readable storage medium embodying computer program code, the non-transitory, computer-readable storage medium being coupled to the data bus, the computer program code interacting with a plurality of computer operations and comprising instructions executable by the processor and configured for:

providing the data center asset to a prospective owner;

establishing a secure communication channel between an onboarding system and the data center asset;

establishing a second communication channel between a rendezvous server and the data center asset, the rendezvous server functioning as a rendezvous point between a newly powered-on data center asset and an onboarding service, the rendezvous server executing a trusted rendezvous service, the trusted rendezvous service being implemented to validate and register data center assets;

exchanging information between the onboarding system and the data center asset via the secure communication channel, the information including a data center asset ownership voucher, the data center asset ownership voucher comprising a structured digital document that links the data center asset with an owner;

maintaining the data center asset ownership voucher at the rendezvous server; and, using the data center asset ownership voucher to associate the data center asset with the prospective owner.

8. The system of claim 7, wherein:

the using the data center asset voucher to associate the data center asset to the customer conforms to a Fast Identity Online (FIDO) Alliance FIDO Device Onboard (FDO) specification.

9. The system of claim 7, wherein:

performing an ownership transfer operation, the ownership transfer operation securely transferring ownership from a current owner of the data center asset to the prospective owner of the data center asset.

10. The system of claim 9, wherein:

the ownership transfer operation allows only an authorized owner of the data center asset to onboard the data center asset when the authorized owner has an associated provider role.

11. The system of claim 7, wherein the instructions executable by the processor are further configured for:

the ownership transfer operation includes providing an updated data center asset ownership voucher to the rendezvous server;

registering the updated data center asset ownership voucher with the rendezvous server as a current data center asset ownership voucher.

12. The system of claim 11, wherein:

the rendezvous server provides a rendezvous point between the data center asset and the data center asset ownership voucher when the data center asset is newly powered on.

13. A non-transitory, computer-readable storage medium embodying computer program code, the computer program code comprising computer executable instructions configured for:

providing the data center asset to a prospective owner;

establishing a secure communication channel between an onboarding system and the data center asset;

establishing a second communication channel between a rendezvous server and the data center asset, the rendezvous server functioning as a rendezvous point between a newly powered-on data center asset and an onboarding service, the rendezvous server executing a trusted rendezvous service, the trusted rendezvous service being implemented to validate and register data center assets;

exchanging information between the onboarding system and the data center asset via the secure communication channel, the information including a data center asset ownership voucher, the data center asset ownership voucher comprising a structured digital document that links the data center asset with an owner;

maintaining the data center asset ownership voucher at the rendezvous server; and, using the data center asset ownership voucher to associate the data center asset with the prospective owner.

14. The non-transitory, computer-readable storage medium of claim 13, wherein:

the using the data center asset voucher to associate the data center asset to the customer conforms to a Fast Identity Online (FIDO) Alliance FIDO Device Onboard (FDO) specification.

15. The non-transitory, computer-readable storage medium of claim 13, wherein the computer executable instructions are further configured for:

performing an ownership transfer operation, the ownership transfer operation securely transferring ownership from a current owner of the data center asset to the prospective owner of the data center asset.

16. The non-transitory, computer-readable storage medium of claim 15, wherein:

the ownership transfer operation allows only an authorized owner of the data center asset to onboard the data center asset when the authorized owner has an associated provider role.

17. The non-transitory, computer-readable storage medium of claim 13, wherein the computer executable instructions are further configured for:

the ownership transfer operation includes providing an updated data center asset ownership voucher to the rendezvous server;

registering the updated data center asset ownership voucher with the rendezvous server as a current data center asset ownership voucher.

18. The non-transitory, computer-readable storage medium of claim 17, wherein:

the rendezvous server provides a rendezvous point between the data center asset and the data center asset ownership voucher when the data center asset is newly powered on.

19. The non-transitory, computer-readable storage medium of claim 13, wherein:

the computer executable instructions are deployable to a client system from a server 2 system at a remote location.

20. The non-transitory, computer-readable storage medium of claim 13, wherein:

the computer executable instructions are provided by a service provider to a user on an on-demand basis.

* * * * *

UNITED STATES PATENT AND TRADEMARK OFFICE
CERTIFICATE OF CORRECTION

PATENT NO. : 12,314,908 B2
APPLICATION NO. : 18/211614
DATED : May 27, 2025
INVENTOR(S) : Stav Sapir et al.

It is certified that error appears in the above-identified patent and that said Letters Patent is hereby corrected as shown below:

In the Claims

Column 34, Line 55, Claim 19, the numeral "2" should be deleted.

Signed and Sealed this
Eighth Day of July, 2025

Coke Morgan Stewart
*Acting Director of the United States Patent and Trademark Office*